United States Patent
Xue et al.

(10) Patent No.: US 12,273,914 B2
(45) Date of Patent: Apr. 8, 2025

(54) SIDELINK CHANNEL ACCESS VIA A FLOATING CHANNEL OCCUPANCY

(71) Applicant: QUALCOMM Incorporated, San Diego, CA (US)

(72) Inventors: Yisheng Xue, San Diego, CA (US); Jing Sun, San Diego, CA (US); Chih-Hao Liu, San Diego, CA (US); Xiaoxia Zhang, San Diego, CA (US); Giovanni Chisci, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 17/877,734

(22) Filed: Jul. 29, 2022

(65) Prior Publication Data
US 2024/0040612 A1    Feb. 1, 2024

(51) Int. Cl.
*H04W 74/08*    (2024.01)
*H04W 74/00*    (2009.01)

(52) U.S. Cl.
CPC ......... *H04W 74/08* (2013.01); *H04W 74/002* (2013.01)

(58) Field of Classification Search
CPC .............................. H04W 74/08; H04W 74/002
See application file for complete search history.

(56) References Cited

U.S. PATENT DOCUMENTS

| 11,812,474 B2 | 11/2023 | Xue et al. | |
| 11,889,555 B2 | 1/2024 | Liu et al. | |
| 2023/0146161 A1 | 5/2023 | Sun et al. | |
| 2023/0403740 A1* | 12/2023 | Fouad | H04W 74/0866 |
| 2024/0023043 A1* | 1/2024 | Jiao | H04W 56/0015 |

OTHER PUBLICATIONS

Co-pending U.S. Appl. No. 18/839,919, inventor XUE; Yisheng, filed on Aug. 20, 2024.

* cited by examiner

*Primary Examiner* — Zhiren Qin
(74) *Attorney, Agent, or Firm* — Holland & Hart LLP

(57) ABSTRACT

This disclosure provides systems, methods and apparatus, including computer programs encoded on computer storage media, for sidelink channel access via a floating channel occupancy. In some aspects, a cellular device may operate within a proximity of one or more wireless fidelity (Wi-Fi) devices and may conditionally support a search space associated with a floating sidelink synchronization signal block (SSB). For example, if the cellular device detects that the Wi-Fi devices are precluding the cellular device from acquiring channel access or otherwise making it relatively more difficult for the cellular device to acquire channel access, the cellular device may enable or active a use of the search space associated with the floating sidelink SSB. If enabled or activated, the cellular device may transmit a floating sidelink SSB within the search space independent of slot boundaries upon a successful listen-before-talk (LBT) procedure.

30 Claims, 11 Drawing Sheets

SIDELINK CHANNEL ACCESS VIA A FLOATING CHANNEL OCCUPANCY

TECHNICAL FIELD

This disclosure relates to wireless communications, including sidelink channel access via a floating channel occupancy.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a first user equipment (UE). The method may include transmitting, to a second UE, control signaling indicating a search space associated with a sidelink synchronization signal block (SSB) and transmitting the sidelink SSB at a starting position within the search space that is independent of slot boundaries within the search space, where the starting position is in accordance with performing a listen-before-talk (LBT) procedure associated with the sidelink SSB.

Another innovative aspect of the subject matter described in this disclosure can be implemented in an apparatus for wireless communications at a first UE. The apparatus may include one or more interfaces and a processing system. The one or more interfaces may be configured to output, to a second UE, control signaling indicating a search space associated with a sidelink SSB and output the sidelink SSB at a starting position within the search space that is independent of slot boundaries within the search space, where the starting position is in accordance with performing an LBT procedure associated with the sidelink SSB.

Another innovative aspect of the subject matter described in this disclosure can be implemented in an apparatus for wireless communications at a first UE. The apparatus may include a processor, memory coupled with the processor, and instructions stored in the memory. The instructions may be executable by the processor to cause the apparatus to transmit, to a second UE, control signaling indicating a search space associated with a sidelink SSB and transmit the sidelink SSB at a starting position within the search space that is independent of slot boundaries within the search space, where the starting position is in accordance with performing an LBT procedure associated with the sidelink SSB.

Another innovative aspect of the subject matter described in this disclosure can be implemented in another apparatus for wireless communications at a first UE. The apparatus may include means for transmitting, to a second UE, control signaling indicating a search space associated with a sidelink SSB and means for transmitting the sidelink SSB at a starting position within the search space that is independent of slot boundaries within the search space, where the starting position is in accordance with performing an LBT procedure associated with the sidelink SSB.

Another innovative aspect of the subject matter described in this disclosure can be implemented in a non-transitory computer-readable medium storing code for wireless communications at a first UE. The code may include instructions executable by a processor to transmit, to a second UE, control signaling indicating a search space associated with a sidelink SSB and transmit the sidelink SSB at a starting position within the search space that is independent of slot boundaries within the search space, where the starting position is in accordance with performing an LBT procedure associated with the sidelink SSB.

Some implementations of the method, apparatuses, and non-transitory computer-readable medium described herein may further include operations, features, means, or instructions for transmitting, to the second UE, one or more data messages using a sidelink shared channel that immediately follows the sidelink SSB in time, where the sidelink SSB indicates a channel occupancy time (COT) associated with the one or more data messages.

One innovative aspect of the subject matter described in this disclosure can be implemented in a method for wireless communications. The method may include receiving, from a first UE at a second UE, control signaling indicating a search space associated with a sidelink SSB and receiving the sidelink SSB at a starting position within the search space that is independent of slot boundaries within the search space.

Another innovative aspect of the subject matter described in this disclosure can be implemented in an apparatus for wireless communications. The apparatus may include one or more interfaces and a processing system. The one or more interfaces may be configured to obtain, from a first UE at a second UE, control signaling indicating a search space associated with a sidelink SSB and obtain the sidelink SSB at a starting position within the search space that is independent of slot boundaries within the search space.

Another innovative aspect of the subject matter described in this disclosure can be implemented in an apparatus for wireless communications. The apparatus may include a processor, memory coupled with the processor, and instructions stored in the memory. The instructions may be executable by the processor to cause the apparatus to receive, from a first UE at a second UE, control signaling indicating a search space associated with a sidelink SSB and receive the sidelink SSB at a starting position within the search space that is independent of slot boundaries within the search space.

Another innovative aspect of the subject matter described in this disclosure can be implemented in another apparatus for wireless communications. The apparatus may include means for receiving, from a first UE at a second UE, control signaling indicating a search space associated with a sidelink SSB and means for receiving the sidelink SSB at a starting position within the search space that is independent of slot boundaries within the search space.

Another innovative aspect of the subject matter described in this disclosure can be implemented in a non-transitory computer-readable medium storing code for wireless communications. The code may include instructions executable by a processor to receive, from a first UE at a second UE, control signaling indicating a search space associated with a sidelink SSB and receive the sidelink SSB at a starting position within the search space that is independent of slot boundaries within the search space.

Some implementations of the method, apparatuses, and non-transitory computer-readable medium described herein may further include operations, features, means, or instructions for receiving, from the first UE, one or more data messages using a sidelink shared channel that immediately follows the sidelink SSB in time, where the sidelink SSB indicates a COT associated with the one or more data messages.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
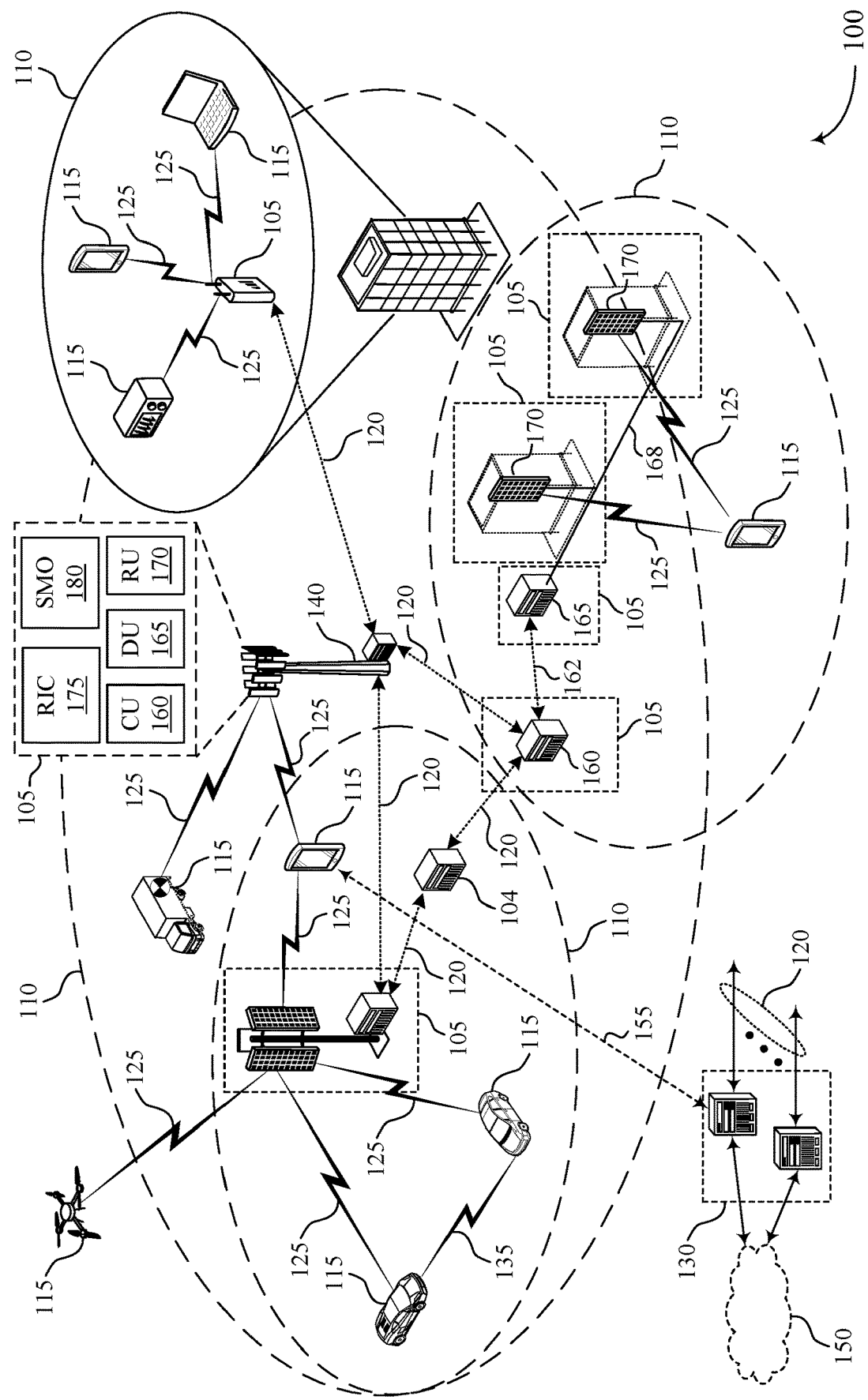
FIG. 1 shows an example wireless communications system that supports sidelink channel access via a floating channel occupancy.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing third generation (3G), fourth generation (4G) or fifth generation (5G), or further implementations thereof, technology.

In some deployment scenarios, various wireless devices may be located within a proximity (such as near) each other and different subsets of devices may communicate using different radio access technologies (RATs). Different RATs may be associated with different channel access techniques or constraints, which may result in channel access difficulties for a first set of devices that use a first RAT if a second set of devices use a second RAT that is associated with more lenient (such as less restricted or structured) channel access techniques than the first RAT. For example, a cellular device (such as a user equipment (UE) that is capable of sidelink communication) may be within a proximity of a wireless fidelity (Wi-Fi) device and, if the cellular device and the Wi-Fi device use a same or similar unlicensed radio frequency band, the cellular device and the Wi-Fi device may compete for channel access. Wi-Fi devices may support asynchronous channel access according to which a Wi-Fi device may immediately occupy a channel upon a successful listen-before-talk (LBT) procedure, while cellular devices may be configured with slot boundaries that define channel access opportunities. As such, Wi-Fi devices may have a competitive advantage over cellular devices in terms of channel access resulting from their relatively unconstrained channel access opportunities, which may adversely impact how often a cellular device is able to occupy and use a channel for data transmission or reception.

In some implementations, a first UE and a second UE (such as two sidelink UEs) may support a search space associated with a floating sidelink synchronization signal block (SSB) and may use the search space associated with the floating sidelink SSB in scenarios in which the first UE or the second UE may otherwise have difficulty in accessing a channel due to one or more other devices, such as one or more Wi-Fi devices. Such a floating sidelink SSB, which may be referred to as an f-S-SSB, may be an example of a sidelink SSB that the first UE transmits to the second UE independent of any configured time domain boundaries (such as symbol or slot boundaries) within the search space associated with the floating sidelink SSB. In other words, the first UE may transmit a floating sidelink SSB at any instance of time, regardless of a symbol or slot boundary, within the search space associated with the floating sidelink SSB. As such, the first UE may perform an LBT procedure and, if the LBT procedure is successful, may transmit a floating sidelink SSB without waiting for a symbol or slot boundary. The floating sidelink SSB may indicate a start of a channel occupancy time (COT) of the first UE and the first UE may transmit one or more data messages to the second UE directly following the floating sidelink SSB. The first UE and the second UE may further support one or more configuration- or signaling-based mechanisms according to which the first UE and the second UE may conditionally support a search space associated with a floating sidelink SSB, indicate configuration information associated with the search space, or indicate timing information associated with a floating sidelink SSB transmission within the search space.

Particular implementations of the subject matter described in this disclosure can be implemented to realize one or more of the following potential advantages. For example, in accordance with supporting a search space associated with a floating sidelink SSB that indicates a COT between the first UE and the second UE, the first UE and the second UE may compete for channel access on equal ground to one or more other devices operating using a same channel and associated with asynchronous channel access (such as one or more Wi-Fi devices), which may enable the first UE and the second UE to achieve robust or reliable channel access and to avoid being "starved out" from channel access by the one or more other devices. As such, the first UE and the second UE may be deployed among Wi-Fi devices and use a same or similar unlicensed radio frequency band as the Wi-Fi devices while maintaining a suitable likelihood for obtaining channel access (such as a likelihood for channel access that supports data rates associated with one or more applications running at the first UE or the second UE). Accordingly, the first UE and the second UE may experience greater link reliability and lower latency, which may support higher data rates, greater system capacity, and greater spectral efficiency, among other benefits. Further, in accordance with supporting a search space associated with a floating sidelink SSB conditionally, the first UE and the second UE may selectively enable less constrained channel access to balance data rates at the first UE and the second UE with data rates between other communicating devices within the system, which may further increase system capacity and facilitate greater adoption of wireless communications systems.

FIG. 1 shows an example wireless communications system 100 that supports sidelink channel access via a floating channel occupancy. The wireless communications system 100 may include one or more network entities 105, one or more UEs 115, and a core network 130. In some implementations, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some implementations, network entities 105 and UEs 115 may wirelessly communicate via one or more communication links 125 (such as a radio frequency (RF) access link). For example, a network entity 105 may support a coverage area 110 (such as a geographic coverage area) over which the UEs 115 and the network entity 105 may establish one or more communication links 125. The coverage area 110 may be an example of a geographic area over which a network entity 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (such as any network entity described herein), a UE 115 (such as any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some implementations, network entities 105 may communicate with the core network 130, or with one another, or both. For example, network entities 105 may communicate with the core network 130 via one or more backhaul communication links 120 (such as in accordance with an S1, N2, N3, or other interface protocol). In some implementations, network entities 105 may communicate with one another via a backhaul communication link 120 (such as in accordance with an X2, Xn, or other interface protocol) either directly (such as directly between network entities 105) or indirectly (such as via a core network 130). In some implementations, network entities 105 may communicate with one another via a midhaul communication link 162 (such as in accordance with a midhaul interface protocol) or a fronthaul communication link 168 (such as in accordance with a fronthaul interface protocol), or any combination thereof. The backhaul communication links 120, midhaul communication links 162, or fronthaul communication links 168 may be or include one or more wired links (such as an electrical link, an optical fiber link), one or more wireless links (such as a radio link, a wireless optical link), among other examples or various combinations thereof. A UE 115 may communicate with the core network 130 via a communication link 155.

One or more of the network entities 105 described herein may include or may be referred to as a base station (BS) 140 (such as a base transceiver station, a radio BS, an NR BS, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some implementations, a network entity 105 (such as a BS 140) may be implemented in an aggregated (such as monolithic, standalone) BS architecture, which may be configured to utilize a protocol stack that is physically or logically integrated within a single network entity 105 (such as a single RAN node, such as a BS 140).

In some implementations, a network entity 105 may be implemented in a disaggregated architecture (such as a disaggregated BS architecture, a disaggregated RAN architecture), which may be configured to utilize a protocol stack that is physically or logically distributed among two or more network entities 105, such as an integrated access backhaul (IAB) network, an open RAN (O-RAN) (such as a network configuration sponsored by the O-RAN Alliance), or a virtualized RAN (vRAN) (such as a cloud RAN (C-RAN)). For example, a network entity 105 may include one or more of a central unit (CU) 160, a distributed unit (DU) 165, a radio unit (RU) 170, a RAN Intelligent Controller (RIC) 175 (such as a Near-Real Time RIC (Near-RT RIC), a Non-Real Time RIC (Non-RT RIC)), a Service Management and Orchestration (SMO) 180 system, or any combination thereof An RU 170 also may be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (such as separate physical locations). In some implementations, one or more network entities 105 of a disaggregated RAN architecture may be implemented as virtual units (such as a virtual CU (VCU), a virtual DU (VDU), a virtual RU (VRU)).

The split of functionality between a CU 160, a DU 165, and an RU 170 is flexible and may support different functionalities depending upon which functions (such as network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some implementations, the CU 160 may host upper protocol layer (such as layer 3 (L3), layer 2 (L2)) functionality and signaling (such as Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (such as physical (PHY) layer) or L2 (such as radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (such as via one or more RUs 170). In some implementations, a functional split between a CU 160 and a DU 165, or between a DU 165 and an RU 170 may be within a protocol layer (such as some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (such as F1, F1-c, F1-u), and a DU 165 may be connected to one or more RUs 170 via a fronthaul communication link 168 (such as open fronthaul (FH) interface). In some implementations, a midhaul communication link 162 or a fronthaul communication link 168 may be implemented in accordance with an interface (such as a channel) between layers of a protocol stack supported by respective network entities 105 that are in communication via such communication links.

In wireless communications systems (such as wireless communications system 100), infrastructure and spectral resources for radio access may support wireless backhaul link capabilities to supplement wired backhaul connections, providing an IAB network architecture (such as to a core network 130). In some implementations, in an IAB network, one or more network entities 105 (such as IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (such as a donor BS 140). The one or more donor network entities 105 (such as IAB donors) may be in communication with one or more additional network entities 105 (such as IAB nodes 104) via supported access and backhaul links (such as backhaul communication links 120). IAB nodes 104 may include an IAB mobile termination (IAB-MT) controlled (such as scheduled) by DUs 165 of a coupled IAB donor. An IAB-MT may include an independent set of antennas for relay of communications with UEs 115, or may share the same antennas (such as of an RU 170) of an IAB node 104 used for access via the DU 165 of the IAB node 104 (such as referred to as virtual IAB-MT (vIAB-MT)). In some implementations, the IAB nodes 104 may include DUs 165 that support communication links with additional entities (such as IAB nodes 104, UEs 115) within the relay chain or configuration of the access network (such as downstream). In such implementations, one or more components of the disaggregated RAN architecture (such as one or more IAB nodes 104 or components of IAB nodes 104) may be configured to operate according to the techniques described herein.

In the implementation of the techniques described herein applied in the context of a disaggregated RAN architecture, one or more components of the disaggregated RAN architecture may be configured to support sidelink channel access via a floating channel occupancy as described herein. For example, some operations described as being performed by a UE 115 or a network entity 105 (such as a BS 140) may additionally, or alternatively, be performed by one or more components of the disaggregated RAN architecture (such as IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay BSs, among other examples, as shown in FIG. 1.

The UEs 115 and the network entities 105 may wirelessly communicate with one another via one or more communication links 125 (such as an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (such as entity, sub-entity) of a network entity 105. For example, the terms "transmitting," "receiving," or "communicating," when referring to a network entity 105, may refer to any portion of a network entity 105 (such as a BS 140, a CU 160, a DU 165, a RU 170) of a RAN communicating with another device (such as directly or via one or more other network entities 105).

Signal waveforms transmitted via a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (such as a duration of one modulation symbol) and one subcarrier, for which the symbol period and subcarrier spacing may be inversely related. The quantity of bits carried by each resource element may depend on the modulation scheme (such as the order of the modulation scheme, the coding rate of the modulation scheme, or both), such that a relatively higher quantity of resource elements (such as in a transmission duration) and a relatively higher order of a modulation scheme may correspond to a relatively higher rate of communication. A wireless communications resource may refer to a combination of an RF spectrum resource, a time resource, and a spatial resource (such as a spatial layer, a beam), and the use of multiple spatial resources may increase the data rate or data integrity for communications with a UE 115.

The time intervals for the network entities 105 or the UEs 115 may be expressed in multiples of a basic time unit which may, in some implementations, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a quantity of slots. Alternatively, each frame may include a variable quantity of slots, and the quantity of slots may depend on subcarrier spacing. Each slot may include a quantity of symbol periods (such as depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as a quantity of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a set of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a network entity 105 (such as a BS 140, an RU 170) may be movable and therefore provide communication coverage for a moving coverage area 110. In some implementations, different coverage areas 110 associated with different technologies may overlap, but the different coverage areas 110 may be supported by the same network entity 105. In some other implementations, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (such as BSs 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (such as via Machine-to-Machine (M2M) communication). M2M communication or MTC may refer to data communication technologies that allow devices to communicate with one another or a network entity 105 (such as a BS 140) without human intervention. In some implementations, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (such as a mode that supports one-way communication via transmission or reception, but not transmission and reception concurrently). In some implementations, half-duplex communications may be performed at a reduced peak rate. Other power conservation techniques for the UEs 115 include entering a power saving deep sleep mode when not engaging in active communications, operating using a limited bandwidth (such as according to narrowband communications), or a combination of these techniques. For example, some UEs 115 may be configured for operation using a narrowband protocol type that is associated with a defined portion or range (such as set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some implementations, a UE 115 may be configured to support communicating directly with other UEs 115 via a device-to-device (D2D) communication link 135 (such as in accordance with a peer-to-peer (P2P), D2D, or sidelink protocol). In some implementations, one or more UEs 115 of a group that are performing D2D communications may be within the coverage area 110 of a network entity 105 (such as a BS 140, an RU 170), which may support aspects of such D2D communications being configured by (such as scheduled by) the network entity 105. In some implementations, one or more UEs 115 of such a group may be outside the coverage area 110 of a network entity 105 or may be otherwise unable to or not configured to receive transmissions from a network entity 105. In some implementations, groups of the UEs 115 communicating via D2D communications may support a one-to-many (1:M) system in which each UE 115 transmits to each of the other UEs 115 in the group. In some implementations, a network entity 105 may facilitate the scheduling of resources for D2D communications. In some other implementations, D2D communications may be carried out between the UEs 115 without an involvement of a network entity 105.

In some systems, a D2D communication link 135 may be an example of a communication channel, such as a sidelink communication channel, between vehicles (such as UEs 115). In some implementations, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some implementations, vehicles in a V2X system may communicate with roadside infrastructure, such as roadside units, or with the network via one or more network nodes (such as network entities 105, BSs 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (such as BSs 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communication using UHF waves may be associated with smaller antennas and shorter ranges (such as less than 100 kilometers) compared to communications using the smaller frequencies and longer waves of the high frequency (HF) or very high frequency (VHF) portion of the spectrum below 300 MHz.

The wireless communications system 100 also may operate using a super high frequency (SHF) region, which may be in the range of 3 GHz to 30 GHz, also known as the centimeter band, or using an extremely high frequency (EHF) region of the spectrum (such as from 30 GHz to 300 GHz), also known as the millimeter band. In some implementations, the wireless communications system 100 may support millimeter wave (mmW) communications between the UEs 115 and the network entities 105 (such as BSs 140, RUs 170), and EHF antennas of the respective devices may be smaller and more closely spaced than UHF antennas. In some implementations, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some implementations, operations using unlicensed bands may be associated with a carrier aggregation configuration in conjunction with component carriers operating using a licensed band (such as LAA). Operations using unlicensed spectrum may include downlink transmissions, uplink transmissions, P2P transmissions, or D2D transmissions, among other examples.

A network entity 105 (such as a BS 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which also may be referred to as spatial filtering, directional transmission, or directional reception, is a signal processing technique that may be used at a transmitting device or a receiving device (such as a network entity 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

In some systems, such as the wireless communications system 100, one or more UEs 115 may be located within a close proximity of one or more devices associated with different channel access techniques. For example, a UE 115 (which may be an example of a cellular device that communicates using a wireless, cellular, or IOT network, such as a system utilizing 3G, 4G, or 5G, or further implementations thereof, technology) may be located within a close proximity to or within a presence of various Wi-Fi devices, which may use a different channel access technique than the UE 115. As described herein, a UE 115 may be an example of a cellular phone, a smart phone, a multimedia/entertainment device (such as a radio or a video device), a camera, a gaming device, a navigation or positioning device (such as global navigation satellite system (GNSS) devices), a tablet computer, a laptop computer, a netbook, a smartbook, a personal computer, a smart device, a wearable device (such as a smart watch, smart clothing, smart glasses, virtual reality goggles, a smart wristband, smart jewelry (such as a smart ring or a smart bracelet)), a drone, a robot/robotic device, a vehicle, a vehicular device, a meter, a monitor, a gas pump, an appliance (such as a kitchen appliance, a washing machine, or a dryer), a location tag, a medical/healthcare device, an implant, a sensor/actuator (S/A), a display, or any other suitable device configured to communicate via a wireless medium.

In such examples in which a UE 115 is an example of a cellular device and is located relatively near a Wi-Fi device, the UE 115 may compete for channel access with the Wi-Fi device. In some scenarios, a Wi-Fi device may have relatively more frequent channel access opportunities than a UE 115, which may preclude the UE 115 from channel access. For example, in a sidelink unlicensed (SL-U) deployment, a UE 115 may perform an LBT procedure and, if the LBT procedure is successful, the UE 115 may wait until a slot or transmission time interval (TTI) boundary to transmit an SSB associated with establishing a COT for the UE 115. A Wi-Fi device, however, may immediately access a channel upon a successful LBT procedure. Such a discrepancy in the structure of channel access techniques between cellular devices and Wi-Fi devices may increase a likelihood that a cellular device is "starved out" from (such as unable to acquire) channel access by one or more Wi-Fi devices.

Accordingly, in some implementations, a sidelink UE 115 may support a conditional search space associated with a floating sidelink SSB. As such, if the sidelink UE 115 measures, calculates, identifies, or otherwise determines that the sidelink UE 115 is at risk of being unable to acquire channel access (such as due to the presence of Wi-Fi devices having less constrained channel access techniques), the sidelink UE 115 may configure a search space associated with a floating sidelink SSB to increase the likelihood of the sidelink UE 115 to acquire channel access. In accordance with configuring the search space associated with the floating sidelink SSB, the sidelink UE 115 may perform an LBT procedure and, if the LBT procedure is successful, the sidelink UE 115 may transmit an SSB at a starting position within the search space that is independent of slot boundaries within the search space. For example, the sidelink UE 115 may transmit the SSB immediately or directly after the successful LBT procedure (such as without waiting for a next slot, symbol, or TTI boundary). The transmission of the floating sidelink SSB may indicate a beginning of a COT for the sidelink UE 115 and the sidelink UE 115 may transmit or receive one or more data messages during the COT.

Figure 2:
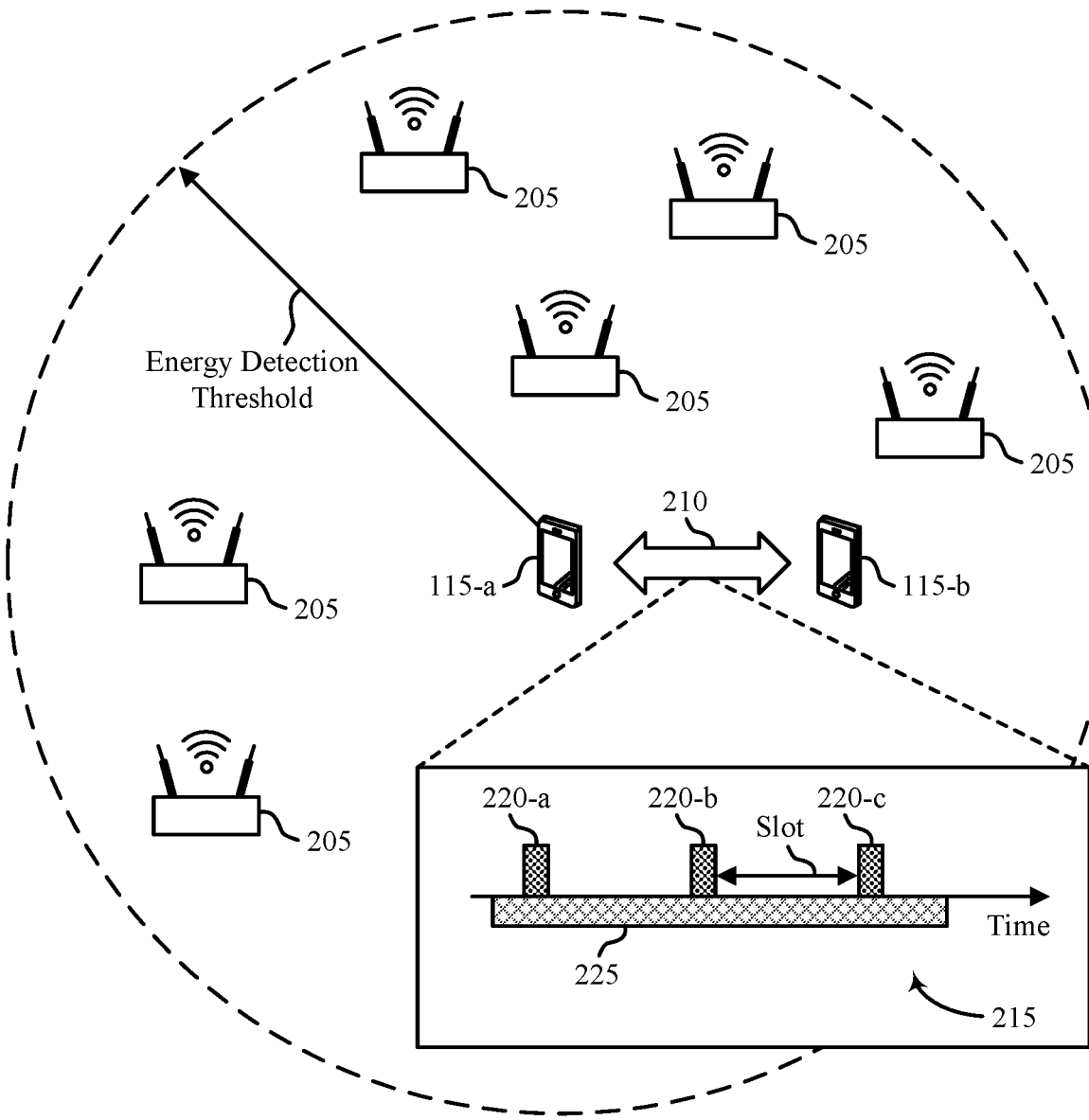
FIG. 2 shows an example multi-radio access technology (RAT) deployment that supports sidelink channel access via a floating channel occupancy.

FIG. 2 shows an example multi-RAT deployment 200 that supports sidelink channel access via a floating channel occupancy. The multi-RAT deployment 200 may implement or be implemented to realize aspects of the wireless communications system 100. For example, the multi-RAT deployment 200 may illustrate communication between a UE 115-a and a UE 115-b within a proximity or presence of one or more Wi-Fi devices 205. The UE 115-a and the UE 115-b may each be an example of a UE 115, such as a sidelink UE 115 or a UE 115 that is capable of communicating via a sidelink, as illustrated by and described with reference to FIG. 1. In some implementations, the UE 115-a and the UE 115-b may support a search space associated with a floating sidelink SSB in scenarios in which the UE 115-a or the UE 115-b, or both, may otherwise have difficulty in obtaining access to a channel (such as due to competition with one or more Wi-Fi devices 205 for channel access). A Wi-Fi device 205 may be an example of an access point (AP), a station (STA), an AP multi-link device (MLD), or a non-AP MLD.

In some deployments, such as for V2X deployments, the UE 115-a and the UE 115-b may be deployed as sidelink UEs 115 that are capable of communicating with each other via a sidelink 210. In some systems, sidelink communication may primarily include an exchanging of safety messages among nearby UEs 115 using sub-7 gigahertz (GHz) bands (such as a 2.4 GHz, 3.5 GHz, 5 GHz, or 6 GHz band), ITS bands, or licensed bands and may support limited functionality for other bands. Further, to facilitate sidelink deployment in an absence of direct control or management from a cellular network, some sidelink systems may support a resource allocation mode according to which UEs 115 may select resources for transmissions autonomously. Such a resource allocation mode may be referred to as a resource allocation mode 2 (RA 2) and may rely on or otherwise be associated with an indicated, configured, or stored resource pool and related configurations.

Following configuration of a resource pool and related configurations, a sidelink UE 115 (such as a sidelink mode 2 UE 115) may utilize channel sensing or reservation, or both, based random channel access to transmit using a resource in a mode 2-based resource pool. In accordance with RA 2 operation, two UEs 115 (such as the UE 115-a and the UE 115-b) may establish a unicast connection via PC5-RRC. The two UEs 115 may support acknowledgement (ACK)- or negative ACK (NACK)-based feedback, such as ACK- or NACK-based hybrid automatic repeat request (HARQ) feedback, via the unicast link. As such, HARQ responses (such as indications of ACK or NACK) may be used for transmit-side radio link failure (RLF) detection (such as after detecting a threshold quantity of consecutive discontinuous transmissions (DTXs) instead of valid HARQ responses, a MAC layer of a UE 115 may report a radio link failure (RLF) to an upper layer). In some systems, the UE 115-a and the UE 115-b may support discontinuous reception (DRX), partial sensing, and inter-UE coordination, which may promote or facilitate adoption of sidelink operation (such as NR sidelink operation) into new or various vertical domains.

Some of such vertical domains, however, may not have access to a sub-7 GHz, ITS, or licensed band. Instead for example, some vertical domains may operate using unlicensed bands. For example, the multi-RAT deployment 200 may support sidelink communication using one or more unlicensed bands and, in some deployments, may support sidelink communication using frequency range 1 (FR1) unlicensed bands, such as a 5 GHz or 6 GHz unlicensed band. The 5 GHz or 6 GHz unlicensed band also may be used by Wi-Fi devices 205, NR unlicensed (NR-U) devices, and LTE-licensed assisted access (LAA) devices (which may be equivalently referred to as SL-U devices). As such, each of such devices may compete for channel access if located within a threshold distance of each other. For example, the UE 115-a may be associated with an energy detection threshold (which may be approximately 72 dBm), which may define or be associated with a range or distance within which the UE 115-a is able to sense wireless communication by other devices.

A technical challenge of SL-U may be associated with how to support LBT, which may be requested by a local regulator, as a coexistence mechanism between such various different devices that may contend for access to an FR unlicensed band. For example, in a dominating load-based-equipment (LBE) mode, each initiator node may run Type 1 LBT in order to transmit data. Further, in implementations in which the multi-RAT deployment 200 supports coexistence between the UE 115-a and the UE 115-b (such as cellular devices) and Wi-Fi devices 205, LBT and channel access challenges or difficulties may result from Wi-Fi devices 205 running asynchronous channel access, while the UE 115-a and the UE 115-b (cellular devices) are relatively more synchronous with defined TTI or slot boundaries that regulate or constrain channel access opportunities. For example, the UE 115-a and the UE 115-b may use a "sub-channel x slot" level of granularity for sidelink channel access such that a receiving UE 115 may search a physical sidelink control channel (PSCCH) (with a fixed time-frequency location in a sub-channel) to identify a valid sidelink transmission. Accordingly, a transmitting UE 115 may be constrained to transmit a PSCCH message at the fixed time-frequency location to facilitate proper reception at the receiving UE 115 (as otherwise the receiving UE 115 may be unaware of and unable to identify a valid sidelink transmission).

As such, and as illustrated in an example communication timeline 215, an amount of sidelink UE opportunities 220 for channel access may be relatively fewer than an amount of Wi-Fi device opportunities 225 for channel access. For example, the UE 115-a or the UE 115-b may have a sidelink UE opportunity 220-a, a sidelink UE opportunity 220-b, and a sidelink UE opportunity 220-c at each slot boundary, without any opportunities for channel access outside of slot boundaries. A Wi-Fi device 205, on the other hand, may have channel access opportunities that are not restricted to TTI or slot boundaries (such as constant channel access opportunities). Even assuming a same cyclic prefix (CP) extension (CPE) as supported in some NR-U deployments, an SL-U UE 115 (such as one or both of the UE 115-a and the UE 115-b) may have fewer channel access opportunities than a Wi-Fi device 205.

For example, if the UE 115-a competes with a single nearby Wi-Fi device 205 for channel access, with both the UE 115-a and the Wi-Fi device 205 carrying full-buffer traffic, the chance for the UE 115-a may be approximately $\frac{1}{14}$ or $\frac{2}{14}$ for a 15 kilohertz (kHz) or 30 kHz subcarrier spacing (SCS). Further, a potentially more realistic situation may result in an even lower likelihood that the UE 115-a is able to acquire channel access, as the UE 115-a may stop or terminate a transmission at a slot boundary as well. A subsequent or following empty slot (such as an empty SL-U slot) may be enough time for a Wi-Fi device 205 to obtain a floating LBT (such as for up to 10 ms). As such, the UE 115-a and UE 115-b pair may be starved out in terms of channel access, while each surrounding Wi-Fi device 205 may acquire $\frac{1}{6}$ of the airtime due to running a same floating LBT-based channel access technique. For example, a Wi-Fi AP or STA may immediately occupy a channel following a successful LBT procedure (such as a Type 1 LBT procedure), while a cellular device may wait for a next TTI or slot boundary after a successful LBT procedure to occupy a channel. As such, if a Wi-Fi device 205 performs a successful LBT procedure that ends between when the cellular device performs a successful LBT procedure and prior to a next TTI or slot boundary, the Wi-Fi device 205 may occupy the channel and preclude the cellular device from access for a duration of a COT of the Wi-Fi device 205.

To address a potential gap between a successful LBT procedure and a next TTI or slot boundary, some cellular devices may employ a "filler" signal (such as a null signal or a signal that is otherwise not associated with conveying data, but that other devices may detect as an indication that the channel is occupied) to occupy a channel before a TTI or slot boundary to avoid being starved (in terms of channel occupancy) by one or more nearby or surrounding Wi-Fi devices 205. Additionally, or alternatively, some cellular devices may employ a mini-slot to facilitate coexistence of NR-U with Wi-Fi. In accordance with using a mini-slot configuration, a length of a filler signal may be limited or constrained to a cyclic prefix (CP) extension (CPE) of an OFDM symbol (such as if assuming a 15 kilohertz (kHz) subcarrier spacing (SCS)). Some SL-U deployments, however, may not support filler signals or a mini-slot configuration.

Additionally, or alternatively, some systems may support a deployment of one or more helping UEs 115 to assist other UEs 115 in obtaining channel access. Such a helping UE 115 may perform channel access procedures without pending data to transmit and may broadcast COT sharing information (such as at indicated or configured sub-channels) to enable other UEs 115 (that have data to transmit) to share the acquired COT. Such helping UEs 115 may be equivalently referred to as COT-sharing UEs 115 and may function similarly to repeaters in Uu or network-configured sidelink synchronization UEs (SyncUEs). A deployment of helping UEs 115, however, may be expensive and some systems may be unable to support such a deployment. As such, sidelink systems that are unable to support a mini-slot configuration or the deployment of helping UEs 115 may still suffer channel access difficulties in scenarios in which two or more sidelink UEs 115 (such as the UE 115-a and the UE 115-b) are surrounded by or located near one or more Wi-Fi devices 205.

In some implementations, the UE 115-a and the UE 115-b may mitigate or reduce the likelihood for LBT or channel access starvation in such scenarios in accordance with supporting a floating COT transmission under conditions allowed by the multi-RAT deployment 200. In other words, the two sidelink UEs 115 may be paired with a unicast link (such as the sidelink 210) and may conditionally agree to use a floating COT transmission. For example, the UE 115-b may agree (such as in response to a request or indication from the UE 115-a) to search for a floating sidelink SSB within a search space and use timing obtained from the floating sidelink SSB to receive a set of sidelink data messages, such as a set of physical sidelink shared channel (PSSCH) messages or transmissions). The UE 115-a may perform an LBT procedure (such as a Type 1 LBT procedure) before or during the search space and, upon successful LBT, the UE 115-a may (immediately) occupy the channel with a floating sidelink SSB transmission followed by the set of sidelink data messages with a corresponding COT. In some aspects, and as illustrated by and described with reference to FIG. 4, the UE 115-a and the UE 115-b may agree (such as pre-agree) on a specific pair of {sidelink primary synchronization signal (PSS), sidelink secondary synchronization signal (SSS)} of the floating sidelink SSB to reduce a blind search complexity at the UE 115-b.

As such, if the UE 115-a and the UE 115-b are unable to support filler signals or mini-slot configurations and if the UE 115-a and the UE 115-b are at risk or a likelihood of having channel access difficulties due to a presence of one or more Wi-Fi devices 205, the UE 115-a and the UE 115-b may support, activate, trigger, or enable a search space associated with a floating sidelink SSB to increase the likelihood of the UE 115-a and the UE 115-b acquiring channel access. In some implementations, a relatively small cluster of UEs 115 (such as approximately 2 or 3 UEs 115) may implement such a search space associated with a floating sidelink SSB when COT sharing may be unable to be fully leveraged to compete with Wi-Fi devices 205 or devices of other RATs, which may balance overall system data rates and data rates of UEs 115 within the relatively small cluster while also maintaining moderate implementation complexity associated with floating sidelink SSB searching. In some implementations, a cluster of UEs 115 (such as a cluster including the UE 115-a and the UE 115-b) may agree to support a search space associated with a floating sidelink SSB in accordance with a satisfaction of a condition associated with use of floating sidelink SSBs and in accordance with a proximity of each UE 115 within the cluster to other UEs 115 within the cluster.

Figure 3:
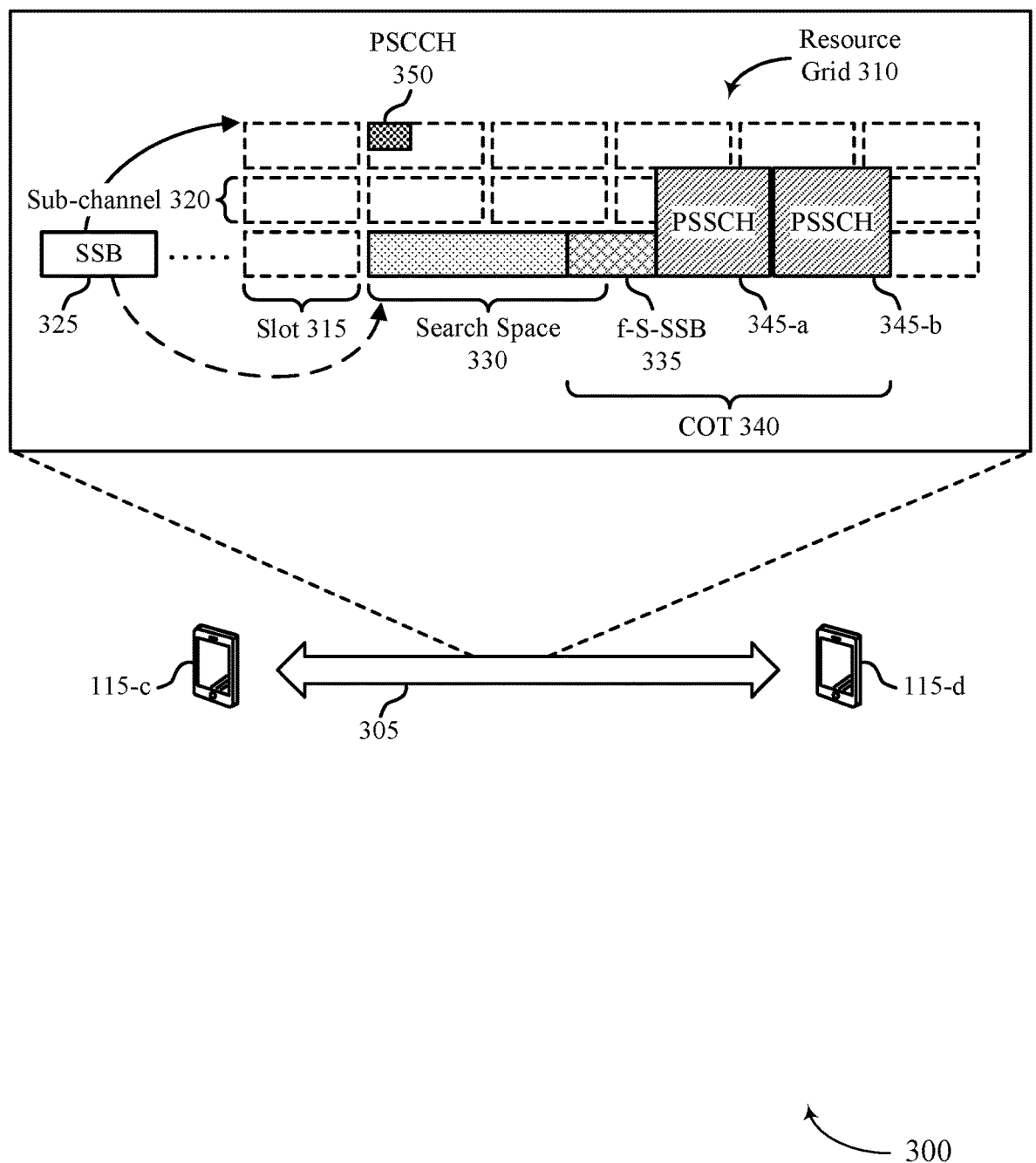
FIG. 3 shows an example signaling diagram that supports sidelink channel access via a floating channel occupancy.

FIG. 3 shows an example signaling diagram 300 that supports sidelink channel access via a floating channel occupancy. The signaling diagram 300 may implement or be implemented to realize aspects of the wireless communications system 100 or the multi-RAT deployment 200. For example, the signaling diagram illustrates communication between a UE 115-c and a UE 115-d via a sidelink 305. The UE 115-c and the UE 115-d may each be examples of a UE 115 or a UE 115-a and a UE 115-b, respectively, as illustrated by and described with reference to FIGS. 1 and 2. The sidelink 305 may be an example of a sidelink 210 as illustrated by and described with reference to FIG. 2. The UE 115-c and the UE 115-d may be deployed in a proximity of devices associated with other RATs (such as one or more Wi-Fi devices 205) and, in some implementations, may support a search space 330 associated with a floating sidelink SSB 335 (as illustrated as an f-S-SSB in FIG. 3) to increase the likelihood of the UE 115-c and the UE 115-d acquiring channel access in such deployments.

In scenarios in which the UE 115-c and the UE 115-d communicate using an unlicensed band, the UE 115-c and the UE 115-d may communicate via resources of a resource grid 310, which may be defined in accordance with a quantity of slots 315 and sub-channels 320. For example, a location within the resource grid 310 may be indicated or defined by a slot 315 and a sub-channel 320. Further, if operating using an unlicensed band associated with LBT, the UE 115-c and the UE 115-d may agree (such as via PC5-RRC signaling) to perform floating COT transmissions under some conditions. For example, the UE 115-c may transmit, to the UE 115-d, an indication of the search space 330 (such as via PC5-RRC signaling or sidelink control information (SCI)) and the UE 115-c may perform an LBT procedure (such as a Type 1 LBT procedure) before or during the search space 330. If the UE 115-c performs a successful LBT procedure (such that the UE 115-c measures that the channel is available), the UE 115-c may perform a COT-based continuous transmission, starting with the floating sidelink SSB 335 followed by a set of PSSCHs 345 (which may generally refer to any one or more of a PSSCH 345-a or a PSSCH 345-b). For example, a transmission of the floating sidelink SSB 335 may indicate a beginning of a COT 340 during which the UE 115-c (and potentially also the UE 115-d) has channel access and is able to use the wireless medium to transmit data.

Likewise, the UE 115-d may receive indication of the search space 330 and the UE 115-d may search or monitor the search space 330 (such as perform blind decoding using resources from the search space 330) for the floating sidelink SSB 335. If the UE 115-d detects the floating sidelink SSB 335, the UE 115-d may use timing information associated with the floating sidelink SSB 335 to receive the set of PSSCHs 345. In other words, the UE 115-d may measure, detect, ascertain, identify, or otherwise determine when the UE 115-d received the floating sidelink SSB 335 and may expect the set of PSSCHs 345 (or the COT 340 of the UE 115-c) to follow (such as immediately follow) the time at which the UE 115-d received the floating sidelink SSB 335.

In some implementations, the UE 115-c and the UE 115-d may conditionally support the search space 330. In other words, the UE 115-c and the UE 115-d may support one or more conditions associated with allowing, enabling, activating, or triggering a floating COT transmission, such as a transmission of the floating sidelink SSB 335. In some implementations, the UE 115-c and the UE 115-d may support the floating sidelink SSB 335 if the UE 115-a is suffering from LBT-based starvation. In some aspects, the UE 115-c may measure, detect, select, identify, or otherwise determine whether the UE 115-c is suffering from LBT-based starvation (such as due to competition for channel access with one or more Wi-Fi devices 205) in accordance with whether a metric satisfies a threshold. In some aspects, the UE 115-c may enable use of the floating sidelink SSB 335 if a quantity of consecutive failed LBT attempts satisfies (such as is greater than) a threshold quantity of consecutive failed LBT attempts. Additionally, or alternatively, the UE 115-c may enable use of the floating sidelink SSB 335 if a ratio between a quantity of failed LBT attempts and a quantity of total LBT attempts with a time window satisfies (such as greater than) a threshold ratio. Such a time window may be a stored, configured, or dynamically indicated time duration.

Additionally, or alternatively, the UE 115-c and the UE 115-d may support the floating sidelink SSB 335 if one or both of the UE 115-c or the UE 115-d detect that the UE 115-c or the UE 115-b is suffering from LBT-based starvation due to another RAT. For example, if the UE 115-c detects that devices of another RAT (such as Wi-Fi devices 205) are precluding the UE 115-c from channel access, the UE 115-c may support or enable use of the floating sidelink SSB 335. Additionally, or alternatively, the UE 115-c may start or enable a transmission of the floating sidelink SSB 335 if the UE 115-a has not decoded any SCI in a slot 315 that would otherwise overlap with the floating sidelink SSB 335. In other words, if the UE 115-c decodes an SCI message in a PSCCH 350 during a first slot 315, the UE 115-c may refrain from transmitting the floating sidelink SSB at any point during the first slot 315 (and may instead transmit the floating sidelink SSB 335 during a second slot 315). As such, the UE 115-a may avoid interfering with any other concurrent sidelinks (such as any other SL-U links).

Additionally, or alternatively, the UE 115-c may back-off to a reservation that may overlap with the floating sidelink SSB 335. For example, if the UE 115-c receives, senses, or detects an indication that an overlapping resource reservation exists, the UE 115-c may refrain from transmitting the floating sidelink SSB and, in some implementations, may release the COT 340 in accordance with the resource reservation at least partially overlapping with the floating sidelink SSB 335. In some aspects, the UE 115-c may back-off to a reservation with an equal or higher priority than a priority associated with the floating sidelink SSB 335 or a priority associated with the UE 115-c. In some other aspects, the UE 115-c may back-off to any reservation that may overlap with the floating sidelink SSB 335 (regardless of priority).

In some implementations, the UE 115-c and the UE 115-b may use a sidelink SSB 325 to select, identify, or otherwise determine timing information associated with the search space 330. For example, if the sidelink SSB 325 (which may be an example of an SSB transmitted at a slot or TTI boundary) is reliable (such as assuming that the sidelink SSB 325 may be transmitted via a Type 2 LBT procedure, such as via a discovery reference signal (DRS) in NR-U or a beacon in Wi-Fi), the search space 330 may be associated with the timing of the sidelink SSB 325. Accordingly, the search space 330 may be statically configured or indicated (such as via L3 hand-shaking) and may be periodic in time. For example, the UE 115-c and the UE 115-d may transmit or receive PC5-RRC or SCI signaling that indicates a time offset between a sidelink SSB 325 and a start of a search space 330 associated with a floating sidelink SSB 335. Additionally, or alternatively, the UE 115-c and the UE 115-d may support an indication of a location (such as a time location or a frequency location, or both) of the search space 330 via the sidelink SSB 325.

Additionally, or alternatively, the UE 115-c and the UE 115-d may support a semi-static configuration of the search space 330 associated with the floating sidelink SSB 335. For example, if the UE 115-c and the UE 115-d support a timing mechanism for the search space 330 associated with a sidelink SSB 325, the UE 115-c and the UE 115-d may agree to support a semi-static search space 330 that may be adaptively reconfigured using L1 or L2 signaling carried in the floating sidelink SSB 335. For example, if a timing of the search space 330 is indicated with respect to a timing of the sidelink SSB 325, the floating sidelink SSB 335 that the UE 115-c transmits during the search space 330 may indicate an updated timing for a next search space 330 associated with a floating sidelink SSB 335. In some aspects, the UE 115-c and the UE 115-d may support such a semi-static configuration of the search space 330 if the UE 115-c has difficulty in obtaining a COT 340 using a statically configured search space 330 or if the sidelink SSB 325 is experiencing starvation due to a strong LBT block from devices using other RATs (such as Wi-Fi devices 205). For example, if the UE 115-c is unable acquire the COT 340 using a statically configured search space 330 or is unable to transmit the sidelink SSB 325, the UE 115-c may send L1 or L2 signaling in the floating sidelink SSB 335 to adjust a timing or location of the search space 330 in a next communications cycle.

Further, as described herein, a floating sidelink SSB 335 may be an example of a sidelink SSB that is transmitted independent of any TTI, slot 315, or symbol boundaries. For example, while sidelink systems may support structured and relatively synchronous communication via a definition of TTIs, slots 315, or symbols, the UE 115-c and the UE 115-d may conditionally support a search space 330 within which the UE 115-c and the UE 115-d may ignore such TTIs, slots 315, or symbols to facilitate or enable more equal channel access competition with devices of other RATs, such as Wi-Fi devices 205. As such, in accordance with transmitting a floating sidelink SSB 335 independent of TTI, slot 315, or symbol boundaries within a search space 330, the UE 115-c may transmit the floating sidelink SSB 335 at any absolute time instance regardless of whether that absolute time instance aligns with a TTI, slot 315, or symbol boundary. Accordingly, being transmitted independent of slot boundaries within the search space 330 may refer to how a floating sidelink SSB 335 may be transmitted in the middle (such as any point in time offset from a beginning or end, and not necessarily an exact middle) of a TTI, slot 315, or symbol within the search space 330. In other words, the UE 115-c may operate as if the UE 115-c is oblivious to any timing-related boundaries within the search space 330.

Figure 4:
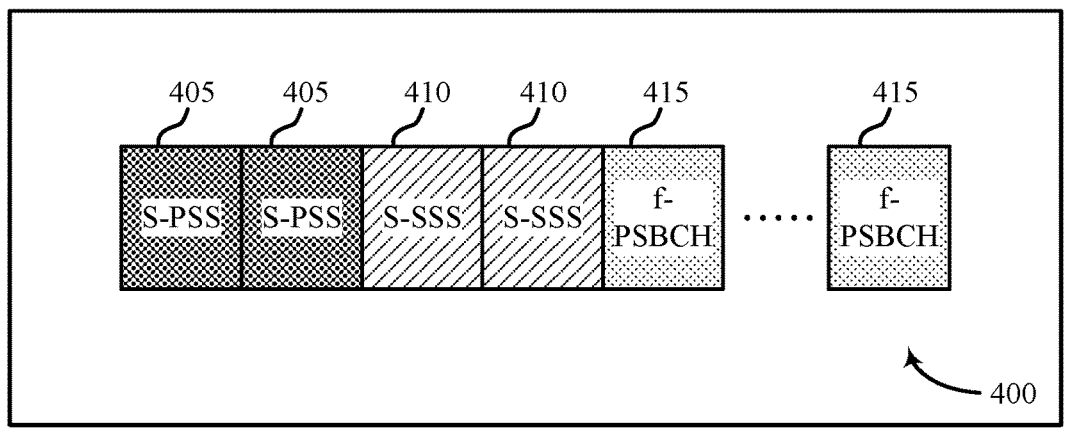
FIG. 4 shows example synchronization signal block (SSB) formats that support sidelink channel access via a floating channel occupancy.
Figure 4:
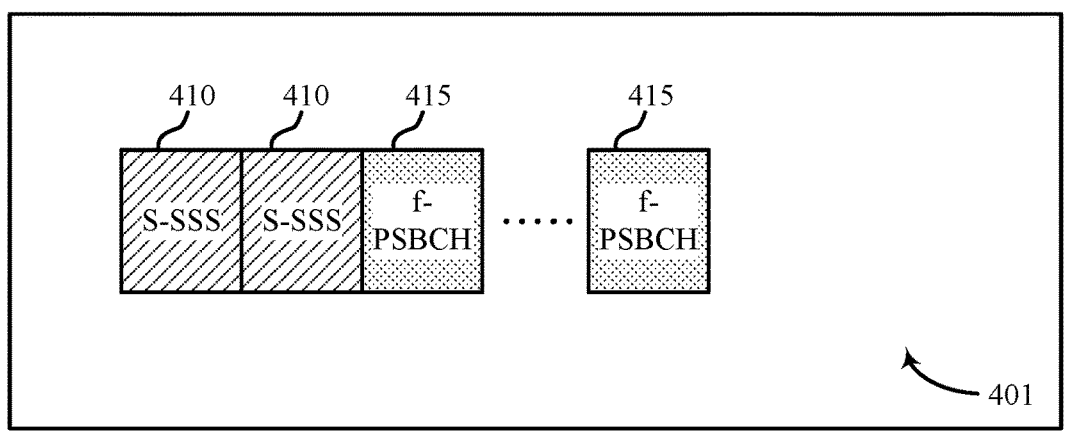
Figure 4:
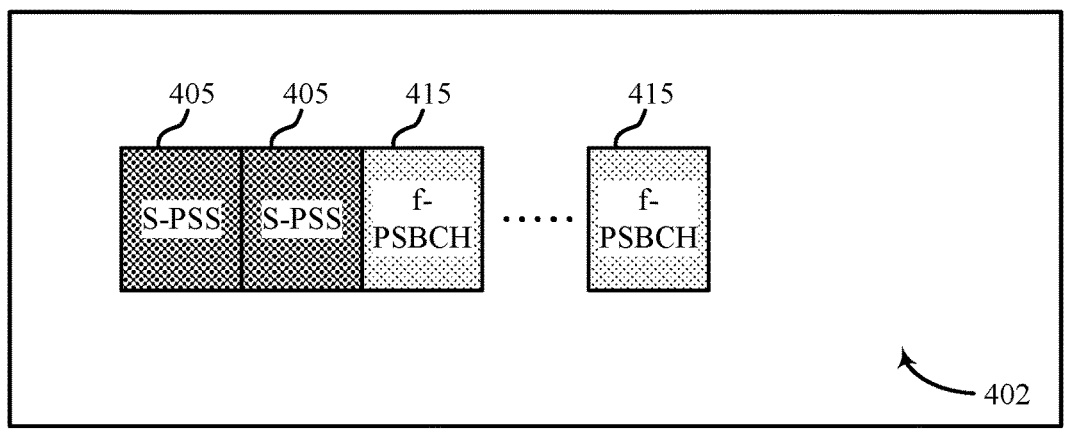

FIG. 4 shows example SSB formats 400, 401, and 402 that support sidelink channel access via a floating channel occupancy. The SSB formats 400, 401, and 402 may implement or be implemented to realize aspects of the wireless communications system 100, the multi-RAT deployment 200, or the signaling diagram 300. For example, a first UE 115 and a second UE 115 may support a search space 330 associated with a floating sidelink SSB 335 and may transmit the floating sidelink SSB 335 in accordance with the SSB format 400, the SSB format 401, or the SSB format 402. The first UE 115 and the second UE 115 may be examples of UEs 115, such as the UE 115-a and the UE 115-b or the UE 115-c and the UE 115-d, as illustrated by and described with reference to FIGS. 1-3.

A sidelink SSB (such as a sidelink SSB 325 as illustrated by and described with reference to FIG. 3) may include 14 symbols to carry sidelink PSSs, sidelink SSSs, and a physical sidelink broadcast channel (PSBCH) and, in some implementations, a quantity of signaling bits that may be carried in a floating sidelink SSB 335 may be less (such as significantly less) than may be carried in a sidelink SSB PSBCH. As such, the first UE 115 and the second UE 115 may support a floating sidelink SSB 335 that is shortened or simplified as compared to a sidelink SSB 325.

In some implementations, the first UE 115 and the second UE 115 may agree on a specific pair of sidelink PSSs 405 (which may be referred to as S-PSSs 405) and sidelink SSSs 410 (which may be referred to as S-SSSs 410) to reduce blind search or synchronization complexity and the first UE 115 may include the specific pairing of sidelink PSSs 405 and sidelink SSSs 410 in the floating sidelink SSB 335. In other words, to reduce blind search or decoding efforts at the second UE 115, the first UE 115 and the second UE 115 may specify a specific pairing of sidelink PSSs 405 and sidelink SSSs 410 (if both are to be used) and the second UE 115 may run or operate a synchronization machine or component for sidelink SSB but with a reduced search space as compared to other sidelink synchronization signals. Further, the first UE 115 and the second UE 115 may refrain from using a gap period in the floating sidelink SSB 335 as the floating sidelink SSB 335 may be followed by a set of PSSCHs 345 in the same COT 340.

In some implementations, and as illustrated by the SSB format 400, the first UE 115 and the second UE 115 may support a floating sidelink SSB 335 associated with two sidelink PSSs 405 and two sidelink SSSs 410. In some other implementations, and as illustrated by the SSB format 401, the first UE 115 and the second UE 115 may support a floating sidelink SSB 335 associated with two sidelink SSSs 410 and an absence of sidelink PSSs 405. In some other implementations, and as illustrated by the SSB format 402, the first UE 115 and the second UE 115 may support a floating sidelink SSB 335 associated with two sidelink PSSs 405 and an absence of sidelink SSSs 410. In accordance with the SSB format 400, the SSB format 401, or the SSB format 402, the floating sidelink SSB 335 may further include a set of floating PSBCHs 415 (which may be referred to as f-PSBCHs 415). A sidelink PSS 405, a sidelink SSS 410, and a floating PSBCH 415 may each occupy one OFDM symbol and, in some aspects, a floating sidelink SSB 335 may include less than 9 floating PSBCHs 415. In other words, a quantity of symbols of a floating sidelink SSB 335 that are allocated to floating PSBCHs 415 may include less than 9 OFDM symbols, such as 1, 2, 3, 4, 5, 6, 7, or 8 OFDM symbols.

Figure 5:
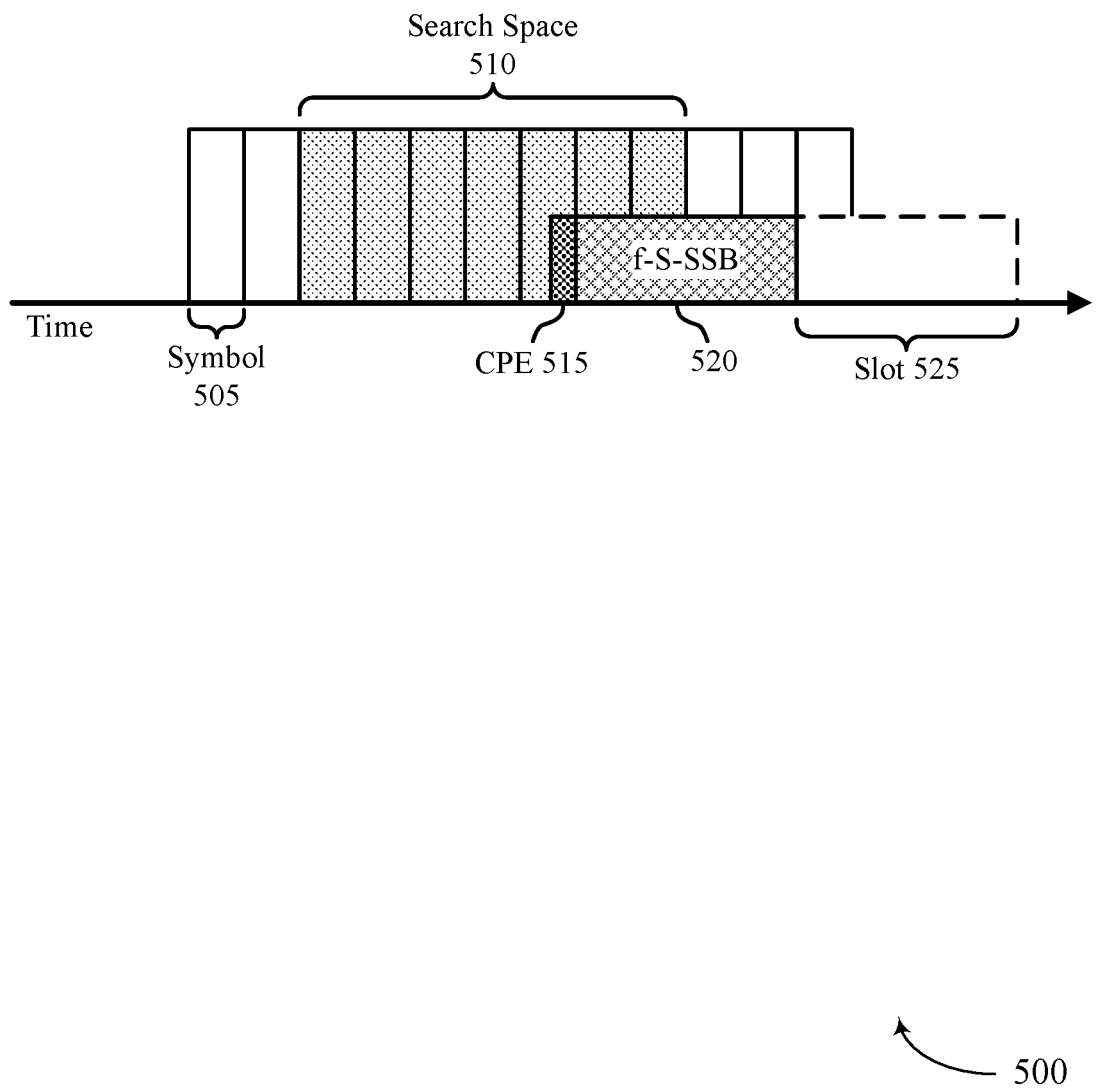
FIG. 5 shows an example communication timeline that supports sidelink channel access via a floating channel occupancy.

FIG. 5 shows an example communication timeline 500 that supports sidelink channel access via a floating channel occupancy. The communication timeline 500 may implement or be implemented to realize aspects of the wireless communications system 100, the multi-RAT deployment 200, the signaling diagram 300, or any one or more of the SSB formats 400, 401, or 402. For example, a first UE 115 and a second UE 115 may communicate in accordance with the communication timeline 500, which may be defined by a quantity of OFDM symbols 505, and may support a search space 510 associated with a floating sidelink SSB 520 (which may be referred to as an f-S-SSB 520). The first UE 115 and the second UE 115 may be examples of UEs 115, such as the UE 115-a and the UE 115-b or the UE 115-c and the UE 115-d, as illustrated by and described with reference to FIGS. 1-4. Further, the search space 510 and the floating sidelink SSB 520 may be examples of the search space 330 and the floating sidelink SSB 335, respectively, as illustrated by and described with reference to FIG. 3.

In some implementations, the first UE 115 and the second UE 115 may agree (such as via a signaling exchange) that the first UE 115 may use a CPE 515 to start a transmission of the floating sidelink SSB 520 at an OFDM symbol boundary. For example, in implementations in which the first UE 115 and the second UE 115 support the search space 510 associated with the floating sidelink SSB 520, the first UE 115 and the second UE 115 may transmit or receive an indication associated with indicating that the first UE 115 may use the CPE 515 to align a transmission of the floating sidelink SSB 520 at an OFDM symbol boundary if the first UE 115 performs a successful LBT procedure that is unaligned with an OFDM symbol boundary. As such, if the first UE 115 performs or detects a successful LBT procedure (such as a successful Type 1 LBT procedure) during a middle of an OFDM symbol 505, the first UE 115 may use the CPE 515 to fill a time gap between the successful LBT procedure and the start of a next OFDM symbol 505, at which time the first UE 115 may transmit the floating sidelink SSB 520.

In some implementations, aligning the floating sidelink SSB 520 with an OFDM symbol boundary may reduce blind detection or synchronization efforts at the second UE 115, as the second UE 115 may expect a start of the floating sidelink SSB 520 to begin at one of a finite quantity of OFDM symbol boundaries within the search space 510. Further, in some implementations, the first UE 115 and the second UE 115 may support a transmission of the floating sidelink SSB 520 at one of a specified set of starting points (such as a set of specified OFDM symbols 505, instead of at any OFDM symbol 505 within the search space 510). In such implementations, the first UE 115 and the second UE 115 may transmit or receive a signal associated with indicating the set of starting points.

Accordingly, the first UE 115 may use a CPE 515 to fill a gap between a successful LBT procedure and a next starting point of the set of starting points and the second UE 115 may likewise search for the floating sidelink SSB 520 at each of the set of starting points (and refrain from searching for the floating sidelink SSB 520 at starting points outside the indicated set of starting points). Such an indicated set of starting points may include a subset of OFDM symbols 505 of a larger set of OFDM symbols 505 within the search space 510, or may be defined regardless of the OFDM symbols 505 (such that the indicated potential starting points may or may not be aligned with an OFDM symbol boundary). Further, in accordance with maintaining synchronization and alignment of the floating sidelink SSB 520 with an OFDM symbol 505, the first UE 115 and the second UE 115 may use other waveforms, such as sidelink channel state information (CSI) reference signal (CSI-RS) waveforms or uplink sounding reference signal (SRS) waveforms, instead of, or in addition to, sidelink PSSs 405 and sidelink SSSs 410.

In implementations in which synchronization with an OFDM symbol 505 is maintained (such as by use of the CPE 515), the first UE 115 may transmit the floating sidelink SSB 520 such that a following or subsequent PSSCH may be transmitted at a slot boundary. In other words, the first UE 115 may set or adjust a length of the floating sidelink SSB 520 in accordance with a remaining quantity of symbols within a current slot until a next slot, such as a slot 525. For example, if there are 4 OFDM symbols 505 remaining in a current slot prior to the next slot 525 after the CPE 515, the first UE 115 may set, adjust, or otherwise modify (such as increase or decrease) a length or duration of the floating sidelink SSB 520 such that an end of the floating sidelink SSB 520 is aligned with a beginning boundary of the slot 525. As such, the first UE 115 may align a PSSCH transmission with the slot 525, which may reduce complexity at a receiver of the second UE 115 while also synchronizing or aligning with sidelink resource allocation structures, such as illustrated by the resource grid 310, which may, in turn, avoid interfering with other communications in the system.

Figure 6:
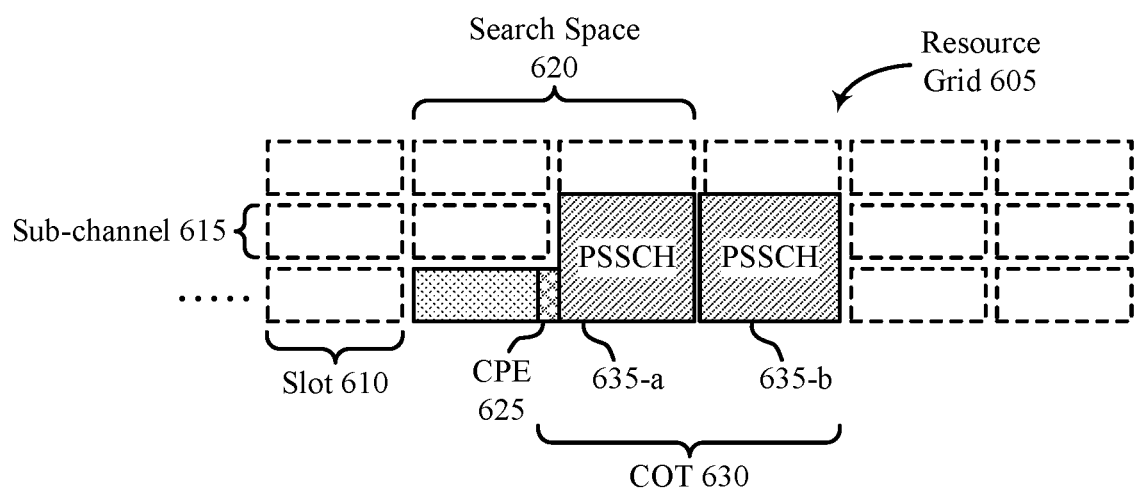
FIG. 6 shows an example resource configuration that supports sidelink channel access via a floating channel occupancy.

FIG. 6 shows an example resource configuration 600 that supports sidelink channel access via a floating channel occupancy. The resource configuration 600 may implement or be implemented to realize aspects of the wireless communications system 100, the multi-RAT deployment 200, the signaling diagram 300, any one or more of the SSB formats 400, 401, or 402, or the communication timeline 500. For example, a first UE 115 and a second UE 115 may support the resource configuration 600 and may use the resource configuration 600 to skip transmission of a floating sidelink SSB 335 if one or more conditions are satisfied. The first UE 115 and the second UE 115 may be examples of UEs 115, such as the UE 115-a and the UE 115-b or the UE 115-c and the UE 115-d, as illustrated by and described with reference to FIGS. 1-5.

The resource configuration 600 may be associated with a resource grid 605, which may be defined by a quantity of slots 610 and sub-channels 615. In some implementations, the first UE 115 and the second UE 115 may support a search space 620 associated with a floating sidelink SSB (such as a floating sidelink SSB 335) and may select not to transmit the floating sidelink SSB, and to directly transmit one or more data messages via one or more PSSCHs 635 (which may refer generally to one or both of a PSSCH 635-a and a PSSCH 635-b) instead, if one or more conditions are satisfied. For example, if the first UE 115 obtains a COT 630 with a range of a CPE 625 of a slot boundary, the first UE 115 may use the CPE 625 to fill a time gap between the start of the COT 630 (which may align with when the first UE 115 performs a successful LBT procedure) and the slot boundary. In such examples, the first UE 115 may start a PSSCH transmission (such as a data transmission using one or both of the PSSCH 635-a and the PSSCH 635-b) at the slot boundary within the search space 620 associated with the floating sidelink SSB (without actually transmitting the floating sidelink SSB).

To support such a direct data transmission without a leading transmission of a floating sidelink SSB, the first UE 115 may indicate a possibility of the direct data transmission to the second UE 115 (such as via PC5-RRC or SCI signaling). As such, the second UE 115 may search for either or both of a floating sidelink SSB or a data transmission from the first UE 115 within the search space 620 associated with the floating sidelink SSB.

Figure 7:
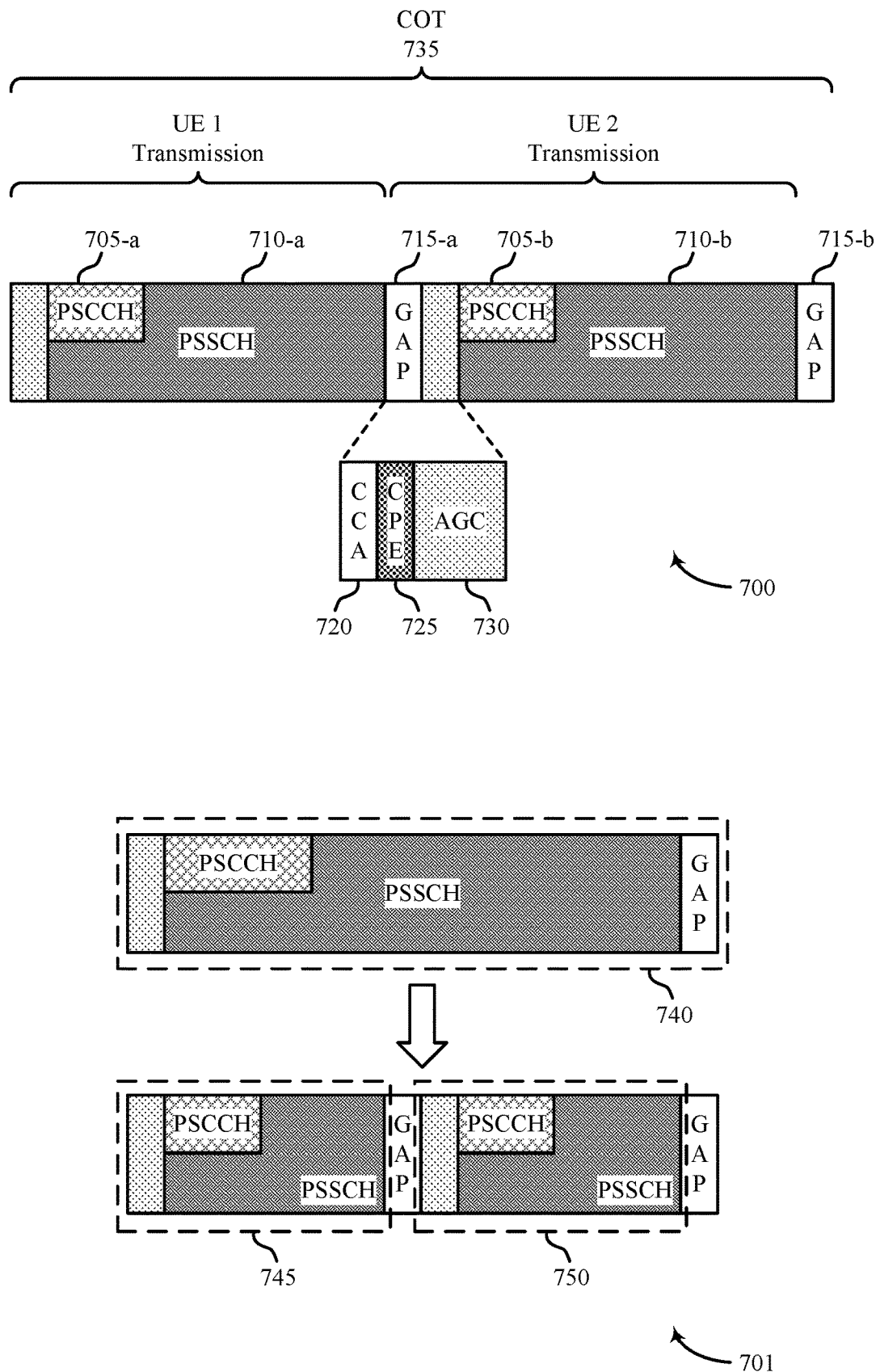
FIG. 7 shows an example channel access techniques that support sidelink channel access via a floating channel occupancy.

FIG. 7 shows example channel access techniques 700 and 701 that support sidelink channel access via a floating channel occupancy. The channel access techniques 700 and 701 may implement or be implemented to realize aspects of the wireless communications system 100, the multi-RAT deployment 200, the signaling diagram 300, any one or more of the SSB formats 400, 401, or 402, the communication timeline 500, or the resource configuration 600. For example, a first UE 115 or a second UE 115 may perform the channel access technique 700 or the channel access technique 701 to attempt to acquire a COT for a data transmission (such as a sidelink data transmission).

As illustrated by the channel access technique 700, which may be an example of a UE-to-UE (such as a sidelink UE-to-sidelink UE) COT-sharing technique, two or more UEs 115 may share a COT 735 for respective transmissions. For example, a first UE 115 may acquire the COT 735 and may share the COT 735 with a second UE 115. As such, the first UE 115 may use a first portion of the COT 735, including for a PSCCH 705-a and a PSSCH 710-a, and the second UE 115 may use a second portion of the COT 735, including for a PSCCH 705-b and a PSSCH 710-b. In some aspects, the COT 735 may include a gap 715-a and a gap 715-b, which may be used by devices sharing the COT 735 to avoid interference or contention within the COT 735.

For example, the gap 715-a may include time for a clear channel assessment (CCA) 720 and a CPE 725. The time interval for the CCA 720 may be used by the second UE 115 for an LBT procedure (such as a Type 2 LBT procedure) and a success of the LBT procedure may enable the second UE 115 to use the second portion of the COT 735. Further, prior to the second portion of the COT during which the second UE 115 transmits, the second UE 115 may perform an automatic gain control (AGC) 730, which may be associated with a corresponding time period during which neither the first UE 115 nor the second UE 115 is performing communications. In some aspects, the channel access technique 700 may facilitate suitable channel access for UEs 115 in a system in which a quantity of sidelink UEs 115 is comparable to a quantity of Wi-Fi devices 205, but may be unable to facilitate suitable channel access in deployments in which Wi-Fi devices 205 outnumber the quantity of sidelink UEs 115 (such as in early SL-U deployments).

As illustrated by the channel access technique 701, which may be an example of a min-slot configuration-based channel access technique, a UE 115 may attempt to acquire channel access in accordance with splitting a slot 740 into a mini-slot 745 and a mini-slot 750. In accordance with supporting the mini-slot 745 and the mini-slot 750, the UE 115 may effectively multiply (such as by a factor of 2 in the example of the channel access technique 701) a quantity of channel access opportunities, but at the cost of also multiplying overhead and SCI decoding efforts. Further, a practical usage of a mini-slot configuration, which may provide greater channel access gain at relatively higher SCSs, may be limited by deployment scenarios (as some deployment scenarios may not support such relatively higher SCSs) and some systems may not support mini-slot configurations. As such, in some implementations, a UE 115 may elect for a search space associated with a floating sidelink SSB, which may enable the UE 115 to compete with other devices, such as Wi-Fi devices 205, for channel access on equal ground.

Figure 8:
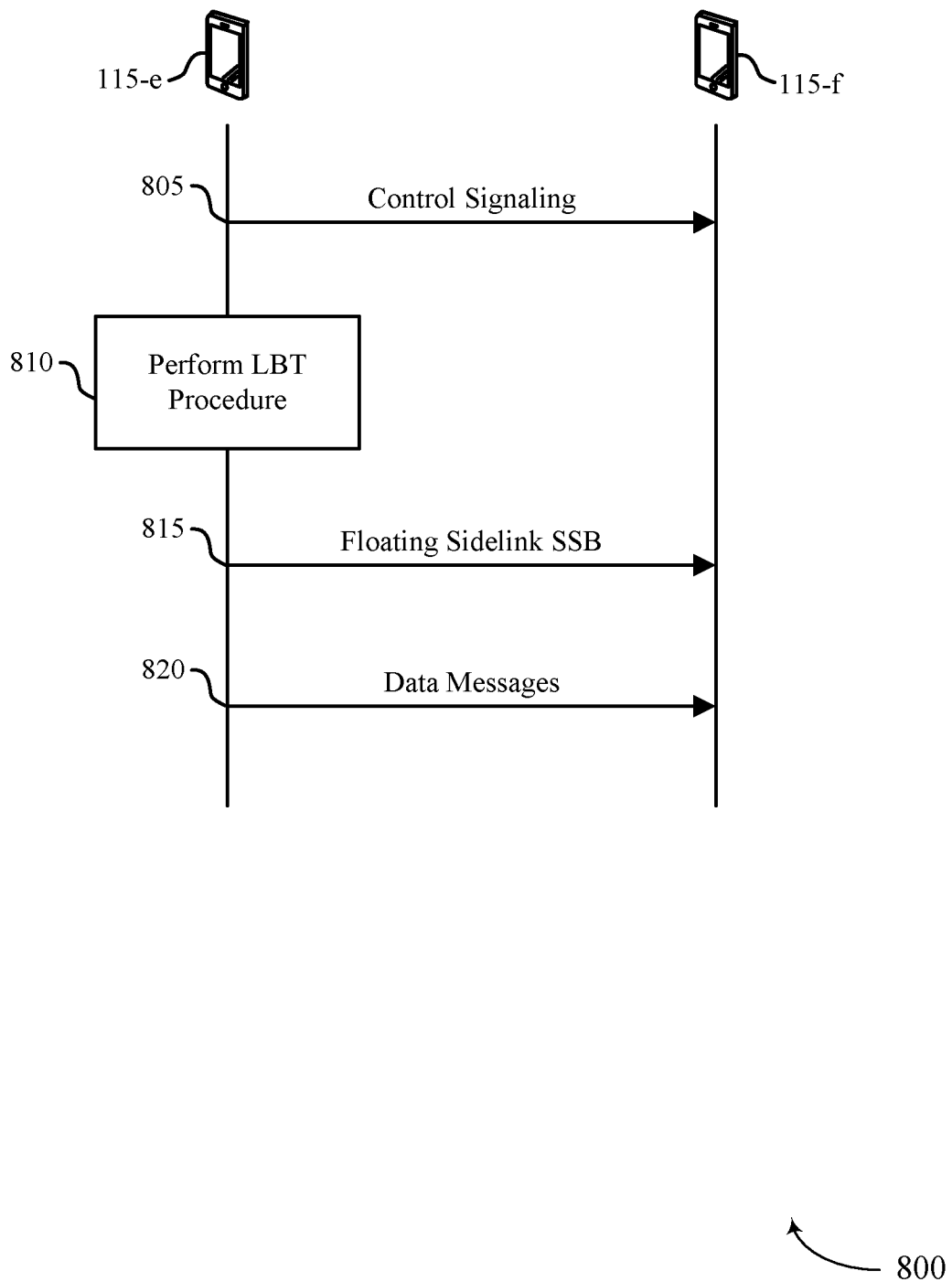
FIG. 8 shows an example process flow that supports sidelink channel access via a floating channel occupancy.

FIG. 8 shows an example process flow 800 that supports sidelink channel access via a floating channel occupancy. The process flow 800 may implement or be implemented to realize aspects of the wireless communications system 100, the multi-RAT deployment 200, the signaling diagram 300, any one or more of the SSB formats 400, 401, or 402, the communication timeline 500, the resource configuration 600, or any one or more of the channel access techniques 700 or 701. For example, the process flow 800 illustrates communication between a UE 115-e and a UE 115-f, which may be examples of two sidelink UEs 115 communicating via an unlicensed radio frequency band, as illustrated by or described with reference to FIGS. 1-7. The UE 115-e and the UE 115-f may be examples of the UE 115-a and the UE 115-b, respectively, or the UE 115-c and the UE 115-d, respectively, as specifically illustrated by and described with reference to FIGS. 2 and 3.

In the following description of the process flow 800, the operations may be performed (such as reported or provided) in a different order than the order shown, or the operations performed by the example devices may be performed in different orders or at different times. For example, specific operations also may be left out of the process flow 800, or other operations may be added to the process flow 800. Further, although some operations or signaling may be shown to occur at different times for discussion purposes, these operations may actually occur at the same time.

At 805, the UE 115-e may transmit, to the UE 115-f, control signaling indicating a search space associated with a sidelink SSB. In some implementations, the sidelink SSB may be a floating sidelink SSB that may be transmitted independent of time domain boundaries (such as TTI, slot, or symbol boundaries) within the search space. In some aspects, the UE 115-e may transmit, as the control signaling, a second sidelink SSB that indicates the search space (such as indicates a time or frequency, or both, location of the search space). Such a second sidelink SSB may be an example of a sidelink SSB that is aligned (such as in accordance with a specification constraint) with a slot boundary). Additionally, or alternatively, the UE 115-a may transmit an indication of a content or format of the sidelink SSB via the control signaling, where the content or format is associated with a specific quantity of sidelink PSSs and a specific quantity of sidelink SSSs. Additionally, or alternatively, the UE 115-a may transmit, via the control signaling, an indication of a set of possible starting positions of the sidelink SSB within the search space. The search space may be dedicated for floating sidelink SSBs such that the UE 115-e may exclusively transmit floating sidelink SSBs within the search space.

In some implementations, the UE 115-e may transmit the control signaling indicating the search space associated with the sidelink SSB (such as the floating sidelink SSB) in accordance with enabling, activating, or triggering support for the search space and floating COT transmissions. For example, the UE 115-e may support the search space and floating COT transmissions within the search space in accordance with performing a threshold quantity of consecutive LBT procedures that result in a failure of the UE 115-e to acquire a COT or in accordance with a ratio between a subset of failed LBT procedures and a total quantity of LBT procedures satisfying a threshold ratio. The UE 115-e may transmit the control signaling via one or more messages and using one or more of PC5-RRC signaling, a MAC control element (MAC-CE), or SCI.

At 810, the UE 115-e may perform an LBT procedure associated with the sidelink SSB (such as the floating sidelink SSB). For example, the UE 115-e may perform one or more LBT procedures during the search space to measure, sense, or otherwise detect if a wireless channel is available for the UE 115-e to transmit data.

At 815, if the UE 115-e performs a successful LBT procedure during the search space, the UE 115-e may transmit the sidelink SSB (such as the floating sidelink SSB) at a starting position within the search space that is independent of slot boundaries within the search space. For example, the UE 115-e may transmit the sidelink SSB using a starting position that is not aligned with a slot boundary. The sidelink SSB may indicate a start of a COT of the UE 115-e for one or more sidelink data messages.

In some implementations, the UE 115-e may transmit the sidelink SSB immediately or directly after the successful LBT (such as without waiting for a slot, symbol, or TTI boundary). In some other implementations, the UE 115-e may fill a time gap between a successful LBT procedure and a symbol boundary with a CPE and may transmit the sidelink SSB at the symbol boundary. Such a symbol boundary may be a next symbol boundary or one of a specified set of possible starting positions for the sidelink SSB. In some implementations, the UE 115-e may set a length or duration of the sidelink SSB such that an ending position of the sidelink SSB aligns with a slot boundary. Additionally, or alternatively, the UE 115-e may transmit, to the UE 115-f via the sidelink SSB, an indication of a second search space associated with a second sidelink SSB (such as another floating sidelink SSB). For example, the UE 115-e may semi-statically update a resource allocation associated with search spaces dedicated for floating sidelink SSBs via a floating sidelink SSB.

At 820, the UE 115-e may transmit, to the UE 115-f, one or more data messages using a sidelink shared channel (such as a PSSCH) that immediately or directly follows the sidelink SSB in time. For example, there may be no time gap between the sidelink SSB and the one or more data messages, or there may be a relatively small time gap during which the UE 115-*e* may adjust one or more transceiver chains prior to transmitting the one or more data messages. In implementations in which the UE 115-*e* aligns an ending position of the sidelink SSB with a slot boundary, the UE 115-*e* may transmit the one or more data messages at the slot boundary.

Figure 9:
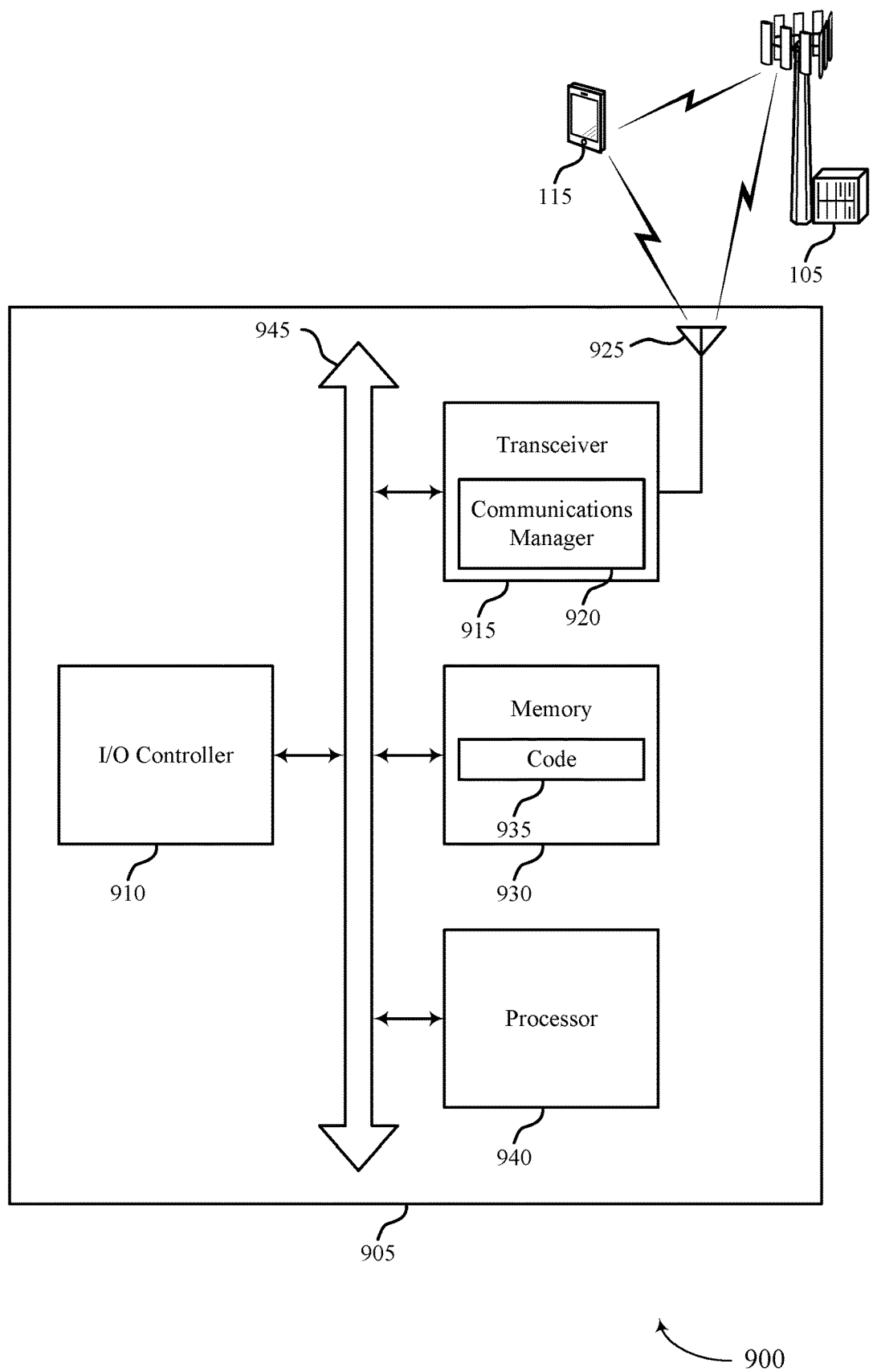
FIG. 9 shows a block diagram of an example device that supports sidelink channel access via a floating channel occupancy.

FIG. 9 shows a block diagram 900 of an example device 905 that supports sidelink channel access via a floating channel occupancy. The device 905 may communicate (such as wirelessly) with one or more network entities (such as one or more components of one or more network entities 105), one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (such as operatively, communicatively, functionally, electronically, electrically) via one or more buses (such as a bus 945).

The I/O controller 910 may manage input and output signals for the device 905. The I/O controller 910 also may manage peripherals not integrated into the device 905. In some implementations, the I/O controller 910 may represent a physical connection or port to an external peripheral. In some implementations, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some implementations, the I/O controller 910 may be implemented as part of a processor or processing system, such as the processor 940. In some implementations, a user may interact with the device 905 via the I/O controller 910 or via hardware components controlled by the I/O controller 910.

In some implementations, the device 905 may include a single antenna 925. However, in some other implementations, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 also may include a modem to modulate the packets, to provide the modulated packets to one or more antennas 925 for transmission, and to demodulate packets received from the one or more antennas 925. In some implementations, the transceiver 915 may include one or more interfaces, such as one or more interfaces coupled with the one or more antennas 925 that are configured to support various receiving or obtaining operations, or one or more interfaces coupled with the one or more antennas 925 that are configured to support various transmitting or outputting operations, or a combination thereof. In some implementations, the transceiver 915 may include or be configured for coupling with one or more processors or memory components that are operable to perform or support operations in accordance with received or obtained information or signals, or to generate information or other signals for transmission or other outputting, or any combination thereof. In some implementations, the transceiver 915, or the transceiver 915 and the one or more antennas 925, or the transceiver 915 and the one or more antennas 925 and one or more processors or memory components (such as the processor 940, or the memory 930, or both), may be included in a chip or chip assembly that is installed in the device 905.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some implementations, the code 935 may not be directly executable by the processor 940 but may cause a computer (such as when compiled and executed) to perform functions described herein. In some implementations, the memory 930 may contain, among other things, a basic I/O system (BIOS) which may control basic hardware or software operation such as the interaction with peripheral components or devices.

The processor 940 may be any one or more suitable processors capable of executing scripts or instructions of one or more software programs stored in the device 905 (such as within the memory 930). In some implementations, the processor 940 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or subcomponents of the device 905, such as the processor 940, or the transceiver 915, or the communications manager 920, or other components or combinations of components of the device 905.

The processing system of the device 905 may interface with other components of the device 905, and may process information received from other components (such as inputs or signals) or output information to other components. For example, a chip or modem of the device 905 may include a processing system and an interface to output information, or to obtain information, or both. The interface may be implemented as or otherwise include one or more interfaces, such as a first interface configured to output information and a second interface configured to obtain information. In some implementations, the first interface may refer to an interface between the processing system of the chip or modem and a transmitter, such that the device 905 may transmit information output from the chip or modem. In some implementations, the second interface may refer to an interface between the processing system of the chip or modem and a receiver, such that the device 905 may obtain information or signal inputs, and the information may be passed to the processing system. A person having ordinary skill in the art will readily recognize that the first interface also may obtain information or signal inputs, and the second interface also may output information or signal outputs. As such, one or more interfaces may refer to a single interface configured to output information and obtain information or may refer to multiple interfaces including one interface configured to at least output information and another interface configured to at least obtain information.

The communications manager 920 may support wireless communication at a first UE in accordance with examples as disclosed herein. For example, the communications manager

920 may be configured as or otherwise support a means for transmitting, to a second UE, control signaling indicating a search space associated with a sidelink SSB. The communications manager 920 may be configured as or otherwise support a means for transmitting the sidelink SSB at a starting position within the search space that is independent of slot boundaries within the search space, where the starting position is in accordance with performing an LBT procedure associated with the sidelink SSB.

In some implementations, the communications manager 920 may be configured as or otherwise support a means for transmitting, to the second UE, one or more data messages using a sidelink shared channel that immediately follows the sidelink SSB in time, where the sidelink SSB indicates a COT associated with the one or more data messages.

In some implementations, the communications manager 920 may be configured as or otherwise support a means for performing a threshold quantity of consecutive LBT procedures, each LBT procedure of the threshold quantity of consecutive LBT procedures associated with one or more slot-based opportunities for channel occupancy, where transmitting the sidelink SSB within the search space at the starting position that is independent of the slot boundaries is associated with a failure of the first UE to obtain a channel occupancy time (COT) in accordance with any of the threshold quantity of consecutive LBT procedures.

In some implementations, the communications manager 920 may be configured as or otherwise support a means for performing a total quantity of LBT procedures within a time duration, each LBT procedure of the total quantity of LBT procedures associated with one or more slot-based opportunities for channel occupancy, where transmitting the sidelink SSB within the search space at the starting position that is independent of the slot boundaries is associated with a ratio between a subset of failed LBT procedures of the total quantity of LBT procedures and the total quantity of LBT procedures satisfying a threshold ratio.

In some implementations, to support performing the LBT procedure associated with the sidelink SSB, the communications manager 920 may be configured as or otherwise support a means for monitoring, within a time duration associated with the search space, a sidelink control channel for SCI, where transmitting the sidelink SSB within the search space at the starting position that is independent of the slot boundaries is associated with the UE failing to decode any SCI messages within the time duration associated with the search space.

In some implementations, the communications manager 920 may be configured as or otherwise support a means for receiving an indication of a resource reservation associated with other sidelink communication, where the resource reservation at least partially overlaps a COT associated with the sidelink SSB. In some implementations, the communications manager 920 may be configured as or otherwise support a means for releasing the COT associated with the sidelink SSB in accordance with the resource reservation at least partially overlapping with the COT.

In some implementations, to support transmitting the control signaling indicating the search space, the communications manager 920 may be configured as or otherwise support a means for transmitting, prior to the search space and using a second starting position that is aligned with a slot boundary, a second sidelink SSB that indicates the search space.

In some implementations, to support transmitting the sidelink SSB, the communications manager 920 may be configured as or otherwise support a means for transmitting, via the sidelink SSB, an indication of a second search space associated with a second sidelink SSB, where a second starting position of the second sidelink SSB is independent of slot boundaries within the second search space.

In some implementations, the communications manager 920 may be configured as or otherwise support a means for transmitting, to the second UE, an indication of a content of the sidelink SSB, where the content of the sidelink SSB is associated with a specific quantity of sidelink PSSs and a specific quantity of sidelink SSSs.

In some implementations, to support transmitting the sidelink SSB, the communications manager 920 may be configured as or otherwise support a means for transmitting the sidelink SSB including a cyclic prefix extension that aligns the starting position of the sidelink SSB with a symbol boundary within the search space.

In some implementations, the communications manager 920 may be configured as or otherwise support a means for transmitting, to the second UE, an indication of a set of possible starting positions of the sidelink SSB, where the starting position of the sidelink SSB is included in the set of possible starting positions.

In some implementations, the communications manager 920 may be configured as or otherwise support a means for transmitting, to the second UE, one or more data messages using a sidelink shared channel that immediately follows the sidelink SSB at a slot boundary, where a duration of the sidelink SSB aligns an ending position of the sidelink SSB with the slot boundary.

In some implementations, the sidelink SSB is a floating sidelink SSB and the search space is exclusively associated with floating sidelink SSBs.

Additionally, or alternatively, the communications manager 920 may support wireless communication in accordance with examples as disclosed herein. For example, the communications manager 920 may be configured as or otherwise support a means for receiving, from a first UE at a second UE, control signaling indicating a search space associated with a sidelink SSB. The communications manager 920 may be configured as or otherwise support a means for receiving the sidelink SSB at a starting position within the search space that is independent of slot boundaries within the search space.

In some implementations, the communications manager 920 may be configured as or otherwise support a means for receiving, from the first UE, one or more data messages using a sidelink shared channel that immediately follows the sidelink SSB in time, where the sidelink SSB indicates a COT associated with the one or more data messages.

In some implementations, receiving the sidelink SSB within the search space at the starting position that is independent of the slot boundaries is associated with a failure of the first UE to obtain a COT in accordance with any of a threshold quantity of consecutive LBT procedures.

In some implementations, receiving the sidelink SSB within the search space at the starting position that is independent of the slot boundaries is associated with a ratio between a subset of failed LBT procedures of a total quantity of LBT procedures at the first UE and the total quantity of LBT procedures satisfying a threshold ratio.

In some implementations, receiving the sidelink SSB within the search space at the starting position that is independent of the slot boundaries is associated with an absence of any SCI messages within a time duration associated with the search space.

In some implementations, to support receiving the control signaling indicating the search space, the communications manager 920 may be configured as or otherwise support a means for receiving, prior to the search space and using a second starting position that is aligned with a slot boundary, a second sidelink SSB that indicates the search space.

In some implementations, to support receiving the sidelink SSB, the communications manager 920 may be configured as or otherwise support a means for receiving, via the sidelink SSB, an indication of a second search space associated with a second sidelink SSB, where a second starting position of the second sidelink SSB is independent of slot boundaries within the second search space.

In some implementations, the communications manager 920 may be configured as or otherwise support a means for receiving, from the first UE, an indication of a content of the sidelink SSB, where the content of the sidelink SSB is associated with a specific quantity of sidelink PSSs and a specific quantity of sidelink SSSs.

In some implementations, the communications manager 920 may be configured as or otherwise support a means for monitoring for the sidelink SSB in accordance with the content of the sidelink SSB.

In some implementations, to support receiving the sidelink SSB, the communications manager 920 may be configured as or otherwise support a means for receiving the sidelink SSB including a cyclic prefix extension that aligns the starting position of the sidelink SSB with a symbol boundary within the search space.

In some implementations, the communications manager 920 may be configured as or otherwise support a means for receiving, from the first UE, an indication of a set of possible starting positions of the sidelink SSB, where the starting position of the sidelink SSB is included in the set of possible starting positions.

In some implementations, the communications manager 920 may be configured as or otherwise support a means for receiving, from the first UE, one or more data messages using a sidelink shared channel that immediately follows the sidelink SSB at a slot boundary, where a duration of the sidelink SSB aligns an ending position of the sidelink SSB with the slot boundary.

In some implementations, the sidelink SSB is a floating sidelink SSB and the search space is exclusively associated with floating sidelink SSBs.

In some implementations, the communications manager 920 may be configured to perform various operations (such as receiving, monitoring, transmitting) using or otherwise in cooperation with the transceiver 915, the one or more antennas 925, or any combination thereof. Although the communications manager 920 is illustrated as a separate component, in some implementations, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of sidelink channel access via a floating channel occupancy as described herein, or the processor 940 and the memory 930 may be otherwise configured to perform or support such operations.

Figure 10:
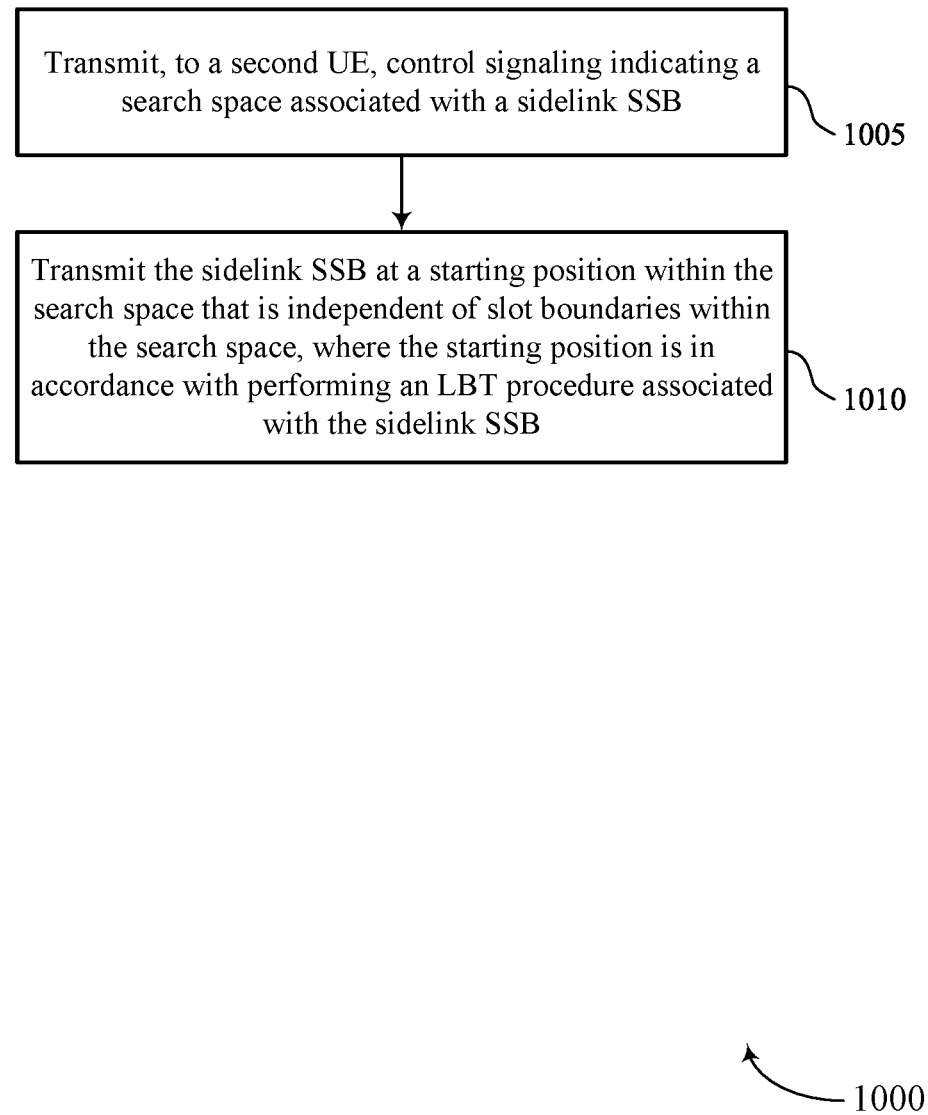
FIGS. 10 and 11 show flowcharts illustrating example methods that support sidelink channel access via a floating channel occupancy.

FIG. 10 shows a flowchart illustrating an example method 1000 that supports sidelink channel access via a floating channel occupancy. The operations of the method 1000 may be implemented by a UE or its components as described herein. For example, the operations of the method 1000 may be performed by a UE 115 as described with reference to FIGS. 1-9. In some implementations, a UE may execute a set of instructions to control the functional elements of the UE to perform the described functions. Additionally, or alternatively, the UE may perform aspects of the described functions using special-purpose hardware.

At 1005, the method may include transmitting, to a second UE, control signaling indicating a search space associated with a sidelink SSB. The operations of 1005 may be performed in accordance with examples as disclosed herein.

At 1010, the method may include transmitting the sidelink SSB at a starting position within the search space that is independent of slot boundaries within the search space, where the starting position is in accordance with performing an LBT procedure associated with the sidelink SSB. The operations of 1010 may be performed in accordance with examples as disclosed herein.

Figure 11:
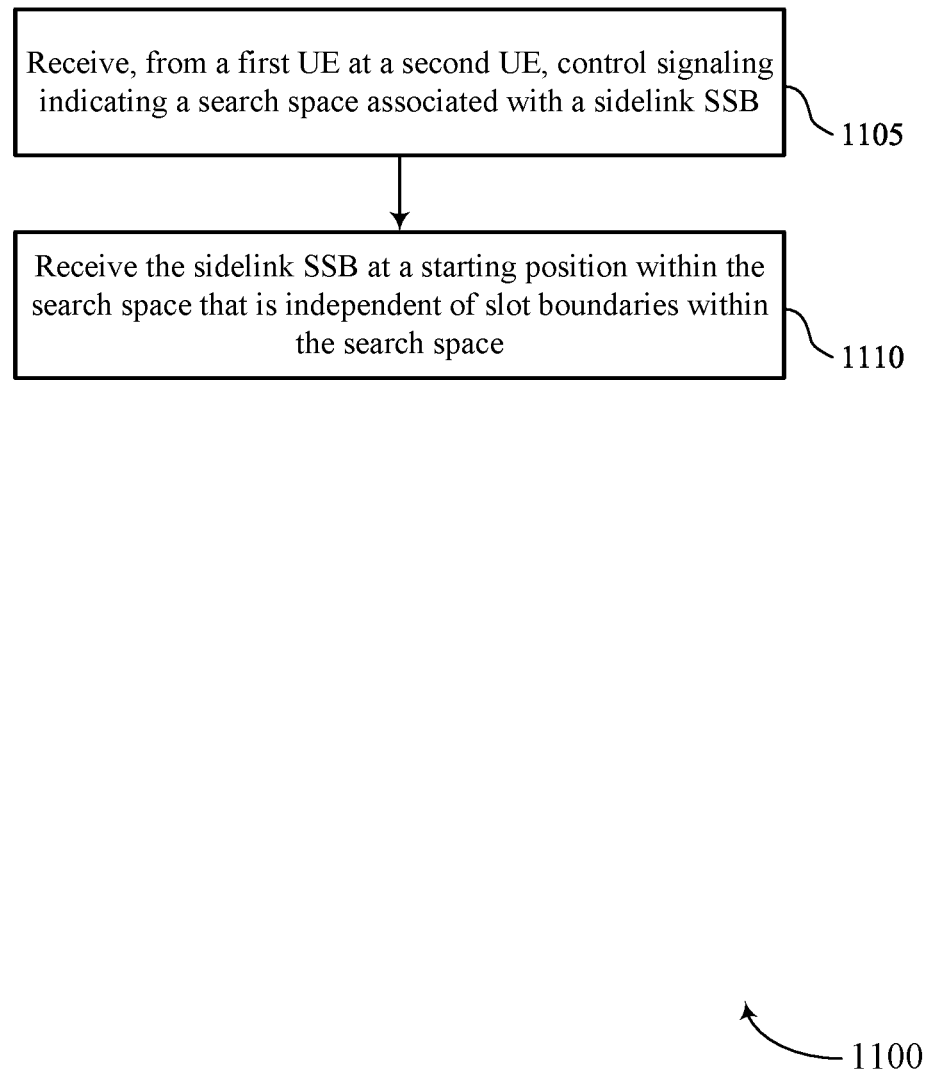

FIG. 11 shows a flowchart illustrating an example method 1100 that supports sidelink channel access via a floating channel occupancy. The operations of the method 1100 may be implemented by a UE or its components as described herein. For example, the operations of the method 1100 may be performed by a UE 115 as described with reference to FIGS. 1-9. In some implementations, a UE may execute a set of instructions to control the functional elements of the UE to perform the described functions. Additionally, or alternatively, the UE may perform aspects of the described functions using special-purpose hardware.

At 1105, the method may include receiving, from a first UE at a second UE, control signaling indicating a search space associated with a sidelink SSB. The operations of 1105 may be performed in accordance with examples as disclosed herein.

At 1110, the method may include receiving the sidelink SSB at a starting position within the search space that is independent of slot boundaries within the search space. The operations of 1110 may be performed in accordance with examples as disclosed herein.

The following provides an overview of some aspects of the present disclosure:

Aspect 1: A method for wireless communication at a first UE, including: transmitting, to a second UE, control signaling indicating a search space associated with a sidelink SSB; and transmitting the sidelink SSB at a starting position within the search space that is independent of slot boundaries within the search space, where the starting position is in accordance with performing an LBT procedure associated with the sidelink SSB.

Aspect 2: The method of aspect 1, further including: transmitting, to the second UE, one or more data messages using a sidelink shared channel that immediately follows the sidelink SSB in time, where the sidelink SSB indicates a COT associated with the one or more data messages.

Aspect 3: The method of any of aspects 1-2, further including: performing a threshold quantity of consecutive LBT procedures, each LBT procedure of the threshold quantity of consecutive LBT procedures associated with one or more slot-based opportunities for channel occupancy, where transmitting the sidelink SSB within the search space at the starting position that is independent of the slot boundaries is associated with a failure of the first UE to obtain a COT in accordance with any of the threshold quantity of consecutive LBT procedures.

Aspect 4: The method of any of aspects 1-3, further including: performing a total quantity of LBT procedures within a time duration, each LBT procedure of the total quantity of LBT procedures associated with one or more slot-based opportunities for channel occupancy, where transmitting the sidelink SSB within the search space at the starting position that is independent of the slot boundaries is associated with a ratio between a subset of failed LBT procedures of the total quantity of LBT procedures and the total quantity of LBT procedures satisfying a threshold ratio.

Aspect 5: The method of any of aspects 1-4, where performing the LBT procedure associated with the sidelink SSB includes: monitoring, within a time duration associated with the search space, a sidelink control channel for SCI, where transmitting the sidelink SSB within the search space at the starting position that is independent of the slot boundaries is associated with the UE failing to decode any SCI messages within the time duration associated with the search space.

Aspect 6: The method of any of aspects 1-5, further including: receiving an indication of a resource reservation associated with other sidelink communication, where the resource reservation at least partially overlaps a COT associated with the sidelink SSB; and releasing the COT associated with the sidelink SSB in accordance with the resource reservation at least partially overlapping with the COT.

Aspect 7: The method of any of aspects 1-6, where transmitting the control signaling indicating the search space includes: transmitting, prior to the search space and using a second starting position that is aligned with a slot boundary, a second sidelink SSB that indicates the search space.

Aspect 8: The method of any of aspects 1-7, where transmitting the sidelink SSB includes: transmitting, via the sidelink SSB, an indication of a second search space associated with a second sidelink SSB, where a second starting position of the second sidelink SSB is independent of slot boundaries within the second search space.

Aspect 9: The method of any of aspects 1-8, further including: transmitting, to the second UE, an indication of a content of the sidelink SSB, where the content of the sidelink SSB is associated with a specific quantity of sidelink PSSs and a specific quantity of sidelink SSSs.

Aspect 10: The method of any of aspects 1-9, where transmitting the sidelink SSB includes: transmitting the sidelink SSB including a cyclic prefix extension that aligns the starting position of the sidelink SSB with a symbol boundary within the search space.

Aspect 11: The method of any of aspects 1-10, further including: transmitting, to the second UE, an indication of a set of possible starting positions of the sidelink SSB, where the starting position of the sidelink SSB is included in the set of possible starting positions.

Aspect 12: The method of any of aspects 1-11, further including: transmitting, to the second UE, one or more data messages using a sidelink shared channel that immediately follows the sidelink SSB at a slot boundary, where a duration of the sidelink SSB aligns an ending position of the sidelink SSB with the slot boundary.

Aspect 13: The method of any of aspects 1-12, where the sidelink SSB is a floating sidelink SSB and the search space is exclusively associated with floating sidelink SSBs.

Aspect 14: A method for wireless communication, including: receiving, from a first UE at a second UE, control signaling indicating a search space associated with a sidelink SSB; and receiving the sidelink SSB at a starting position within the search space that is independent of slot boundaries within the search space.

Aspect 15: The method of aspect 14, further including: receiving, from the first UE, one or more data messages using a sidelink shared channel that immediately follows the sidelink SSB in time, where the sidelink SSB indicates a COT associated with the one or more data messages.

Aspect 16: The method of any of aspects 14-15, where receiving the sidelink SSB within the search space at the starting position that is independent of the slot boundaries is associated with a failure of the first UE to obtain a COT in accordance with any of a threshold quantity of consecutive LBT procedures.

Aspect 17: The method of any of aspects 14-16, where receiving the sidelink SSB within the search space at the starting position that is independent of the slot boundaries is associated with a ratio between a subset of failed LBT procedures of a total quantity of LBT procedures at the first UE and the total quantity of LBT procedures satisfying a threshold ratio.

Aspect 18: The method of any of aspects 14-17, where receiving the sidelink SSB within the search space at the starting position that is independent of the slot boundaries is associated with an absence of any SCI messages within a time duration associated with the search space.

Aspect 19: The method of any of aspects 14-18, where receiving the control signaling indicating the search space includes: receiving, prior to the search space and using a second starting position that is aligned with a slot boundary, a second sidelink SSB that indicates the search space.

Aspect 20: The method of any of aspects 14-19, where receiving the sidelink SSB includes: receiving, via the sidelink SSB, an indication of a second search space associated with a second sidelink SSB, where a second starting position of the second sidelink SSB is independent of slot boundaries within the second search space.

Aspect 21: The method of any of aspects 14-20, further including: receiving, from the first UE, an indication of a content of the sidelink SSB, where the content of the sidelink SSB is associated with a specific quantity of sidelink PSSs and a specific quantity of sidelink SSSs.

Aspect 22: The method of aspect 21, further including: monitoring for the sidelink SSB in accordance with the content of the sidelink SSB.

Aspect 23: The method of any of aspects 14-22, where receiving the sidelink SSB includes: receiving the sidelink SSB including a cyclic prefix extension that aligns the starting position of the sidelink SSB with a symbol boundary within the search space.

Aspect 24: The method of any of aspects 14-23, further including: receiving, from the first UE, an indication of a set of possible starting positions of the sidelink SSB, where the starting position of the sidelink SSB is included in the set of possible starting positions.

Aspect 25: The method of any of aspects 14-24, further including: receiving, from the first UE, one or more data messages using a sidelink shared channel that immediately follows the sidelink SSB at a slot boundary, where a duration of the sidelink SSB aligns an ending position of the sidelink SSB with the slot boundary.

Aspect 26: The method of any of aspects 14-25, where the sidelink SSB is a floating sidelink SSB and the search space is exclusively associated with floating sidelink SSBs.

Aspect 27: An apparatus for wireless communication at a first UE, including: one or more interfaces configured to: output, to a second UE, control signaling indicating a search space associated with a sidelink SSB; and output the sidelink SSB at a starting position within the search space that is independent of slot boundaries within the search space, where the starting position is in accordance with performing an LBT procedure associated with the sidelink SSB.

Aspect 28: The apparatus of aspect 27, where the one or more interfaces are further configured to: output, to the second UE, one or more data messages using a sidelink shared channel that immediately follows the sidelink SSB in time, where the sidelink SSB indicates a COT associated with the one or more data messages.

Aspect 29: The apparatus of any of aspects 27-28, where a processing system is further configured to: perform a threshold quantity of consecutive LBT procedures, each LBT procedure of the threshold quantity of consecutive LBT procedures associated with one or more slot-based opportunities for channel occupancy, where outputting the sidelink SSB within the search space at the starting position that is independent of the slot boundaries is associated with a failure of the first UE to obtain a COT in accordance with any of the threshold quantity of consecutive LBT procedures.

Aspect 30: The apparatus of any of aspects 27-29, where a processing system is further configured to: perform a total quantity of LBT procedures within a time duration, each LBT procedure of the total quantity of LBT procedures associated with one or more slot-based opportunities for channel occupancy, where outputting the sidelink SSB within the search space at the starting position that is independent of the slot boundaries is associated with a ratio between a subset of failed LBT procedures of the total quantity of LBT procedures and the total quantity of LBT procedures satisfying a threshold ratio.

Aspect 31: The apparatus of any of aspects 27-30, where, to perform the LBT procedure associated with the sidelink SSB, a processing system is further configured to: monitor, within a time duration associated with the search space, a sidelink control channel for SCI, where outputting the sidelink SSB within the search space at the starting position that is independent of the slot boundaries is associated with the UE failing to decode any SCI messages within the time duration associated with the search space.

Aspect 32: The apparatus of any of aspects 27-31, where: the one or more interfaces are further configured to: obtain an indication of a resource reservation associated with other sidelink communication, where the resource reservation at least partially overlaps a COT associated with the sidelink SSB; and a processing system is configured to: release the COT associated with the sidelink SSB in accordance with the resource reservation at least partially overlapping with the COT.

Aspect 33: The apparatus of any of aspects 27-32, where, to output the control signaling indicating the search space, the one or more interfaces are further configured to: output, prior to the search space and using a second starting position that is aligned with a slot boundary, a second sidelink SSB that indicates the search space.

Aspect 34: The apparatus of any of aspects 27-33, where, to output the sidelink SSB, the one or more interfaces are further configured to: output, via the sidelink SSB, an indication of a second search space associated with a second sidelink SSB, where a second starting position of the second sidelink SSB is independent of slot boundaries within the second search space.

Aspect 35: The apparatus of any of aspects 27-34, where the one or more interfaces are further configured to: output, to the second UE, an indication of a content of the sidelink SSB, where the content of the sidelink SSB is associated with a specific quantity of sidelink PSSs and a specific quantity of sidelink SSSs.

Aspect 36: The apparatus of any of aspects 27-35, where, to output the sidelink SSB, the one or more interfaces are further configured to: output the sidelink SSB including a cyclic prefix extension that aligns the starting position of the sidelink SSB with a symbol boundary within the search space.

Aspect 37: The apparatus of any of aspects 27-36, where the one or more interfaces are further configured to: output, to the second UE, an indication of a set of possible starting positions of the sidelink SSB, where the starting position of the sidelink SSB is included in the set of possible starting positions.

Aspect 38: The apparatus of any of aspects 27-37, where the one or more interfaces are further configured to: output, to the second UE, one or more data messages using a sidelink shared channel that immediately follows the sidelink SSB at a slot boundary, where a duration of the sidelink SSB aligns an ending position of the sidelink SSB with the slot boundary.

Aspect 39: The apparatus of any of aspects 27-38, where the sidelink SSB is a floating sidelink SSB and the search space is exclusively associated with floating sidelink SSBs.

Aspect 40: An apparatus for wireless communication, including: one or more interfaces configured to: obtain, from a first UE at a second UE, control signaling indicating a search space associated with a sidelink SSB; and obtain the sidelink SSB at a starting position within the search space that is independent of slot boundaries within the search space.

Aspect 41: The apparatus of aspect 40, where the one or more interfaces are further configured to: obtain, from the first UE, one or more data messages using a sidelink shared channel that immediately follows the sidelink SSB in time, where the sidelink SSB indicates a COT associated with the one or more data messages.

Aspect 42: The apparatus of any of aspects 40-41, where obtaining the sidelink SSB within the search space at the starting position that is independent of the slot boundaries is associated with a failure of the first UE to obtain a COT in accordance with any of a threshold quantity of consecutive LBT procedures.

Aspect 43: The apparatus of any of aspects 40-42, where obtaining the sidelink SSB within the search space at the starting position that is independent of the slot boundaries is associated with a ratio between a subset of failed LBT procedures of a total quantity of LBT procedures at the first UE and the total quantity of LBT procedures satisfying a threshold ratio.

Aspect 44: The apparatus of any of aspects 40-43, where obtaining the sidelink SSB within the search space at the starting position that is independent of the slot boundaries is associated with an absence of any SCI messages within a time duration associated with the search space.

Aspect 45: The apparatus of any of aspects 40-44, where, to obtain the control signaling indicating the search space, the one or more interfaces are configured to: obtain, prior to the search space and using a second starting position that is aligned with a slot boundary, a second sidelink SSB that indicates the search space.

Aspect 46: The apparatus of any of aspects 40-45, where, to obtain the sidelink SSB, the one or more interfaces are configured to: obtain, via the sidelink SSB, an indication of a second search space associated with a second sidelink SSB, where a second starting position of the second sidelink SSB is independent of slot boundaries within the second search space.

Aspect 47: The apparatus of any of aspects 40-46, where the one or more interfaces are configured to: obtain, from the first UE, an indication of a content of the sidelink SSB, where the content of the sidelink SSB is associated with a specific quantity of sidelink PSSs and a specific quantity of sidelink SSSs.

Aspect 48: The apparatus of aspect 47, where the one or more interfaces are configured to: monitor for the sidelink SSB in accordance with the content of the sidelink SSB.

Aspect 49: The apparatus of any of aspects 40-48, where, to obtain the sidelink SSB, the one or more interfaces are configured to: obtain the sidelink SSB including a cyclic prefix extension that aligns the starting position of the sidelink SSB with a symbol boundary within the search space.

Aspect 50: The apparatus of any of aspects 40-49, where the one or more interfaces are configured to: obtain, from the first UE, an indication of a set of possible starting positions of the sidelink SSB, where the starting position of the sidelink SSB is included in the set of possible starting positions.

Aspect 51: The apparatus of any of aspects 40-50, where the one or more interfaces are configured to: obtain, from the first UE, one or more data messages using a sidelink shared channel that immediately follows the sidelink SSB at a slot boundary, where a duration of the sidelink SSB aligns an ending position of the sidelink SSB with the slot boundary.

Aspect 52: The apparatus of any of aspects 40-51, where the sidelink SSB is a floating sidelink SSB and the search space is exclusively associated with floating sidelink SSBs.

Aspect 53: An apparatus for wireless communication at a first UE, including: means for transmitting, to a second UE, control signaling indicating a search space associated with a sidelink SSB; and means for transmitting the sidelink SSB at a starting position within the search space that is independent of slot boundaries within the search space, where the starting position is in accordance with performing an LBT procedure associated with the sidelink SSB.

Aspect 54: The apparatus of aspect 53, further including: means for transmitting, to the second UE, one or more data messages using a sidelink shared channel that immediately follows the sidelink SSB in time, where the sidelink SSB indicates a COT associated with the one or more data messages.

Aspect 55: The apparatus of any of aspects 53-54, further including: means for performing a threshold quantity of consecutive LBT procedures, each LBT procedure of the threshold quantity of consecutive LBT procedures associated with one or more slot-based opportunities for channel occupancy, where transmitting the sidelink SSB within the search space at the starting position that is independent of the slot boundaries is associated with a failure of the first UE to obtain a COT in accordance with any of the threshold quantity of consecutive LBT procedures.

Aspect 56: The apparatus of any of aspects 53-55, further including: means for performing a total quantity of LBT procedures within a time duration, each LBT procedure of the total quantity of LBT procedures associated with one or more slot-based opportunities for channel occupancy, where transmitting the sidelink SSB within the search space at the starting position that is independent of the slot boundaries is associated with a ratio between a subset of failed LBT procedures of the total quantity of LBT procedures and the total quantity of LBT procedures satisfying a threshold ratio.

Aspect 57: The apparatus of any of aspects 53-56, where the means for performing the LBT procedure associated with the sidelink SSB include: means for monitoring, within a time duration associated with the search space, a sidelink control channel for SCI, where transmitting the sidelink SSB within the search space at the starting position that is independent of the slot boundaries is associated with the UE failing to decode any SCI messages within the time duration associated with the search space.

Aspect 58: The apparatus of any of aspects 53-57, further including: means for receiving an indication of a resource reservation associated with other sidelink communication, where the resource reservation at least partially overlaps a COT associated with the sidelink SSB; and means for releasing the COT associated with the sidelink SSB in accordance with the resource reservation at least partially overlapping with the COT.

Aspect 59: The apparatus of any of aspects 53-58, where the means for transmitting the control signaling indicating the search space include: means for transmitting, prior to the search space and using a second starting position that is aligned with a slot boundary, a second sidelink SSB that indicates the search space.

Aspect 60: The apparatus of any of aspects 53-59, where the means for transmitting the sidelink SSB include: means for transmitting, via the sidelink SSB, an indication of a second search space associated with a second sidelink SSB, where a second starting position of the second sidelink SSB is independent of slot boundaries within the second search space.

Aspect 61: The apparatus of any of aspects 53-60, further including: means for transmitting, to the second UE, an indication of a content of the sidelink SSB, where the content of the sidelink SSB is associated with a specific quantity of sidelink PSSs and a specific quantity of sidelink SSSs.

Aspect 62: The apparatus of any of aspects 53-61, where the means for transmitting the sidelink SSB include: means for transmitting the sidelink SSB including a cyclic prefix extension that aligns the starting position of the sidelink SSB with a symbol boundary within the search space.

Aspect 63: The apparatus of any of aspects 53-62, further including: means for transmitting, to the second UE, an indication of a set of possible starting positions of the sidelink SSB, where the starting position of the sidelink SSB is included in the set of possible starting positions.

Aspect 64: The apparatus of any of aspects 53-63, further including: means for transmitting, to the second UE, one or more data messages using a sidelink shared channel that immediately follows the sidelink SSB at a slot boundary, where a duration of the sidelink SSB aligns an ending position of the sidelink SSB with the slot boundary.

Aspect 65: The apparatus of any of aspects 53-64, where the sidelink SSB is a floating sidelink SSB and the search space is exclusively associated with floating sidelink SSBs.

Aspect 66: An apparatus for wireless communication, including: means for receiving, from a first UE at a second UE, control signaling indicating a search space associated with a sidelink SSB; and means for receiving the sidelink SSB at a starting position within the search space that is independent of slot boundaries within the search space.

Aspect 67: The apparatus of aspect 66, further including: means for receiving, from the first UE, one or more data messages using a sidelink shared channel that immediately follows the sidelink SSB in time, where the sidelink SSB indicates a COT associated with the one or more data messages.

Aspect 68: The apparatus of any of aspects 66-67, where receiving the sidelink SSB within the search space at the starting position that is independent of the slot boundaries is associated with a failure of the first UE to obtain a COT in accordance with any of a threshold quantity of consecutive LBT procedures.

Aspect 69: The apparatus of any of aspects 66-68, where receiving the sidelink SSB within the search space at the starting position that is independent of the slot boundaries is associated with a ratio between a subset of failed LBT procedures of a total quantity of LBT procedures at the first UE and the total quantity of LBT procedures satisfying a threshold ratio.

Aspect 70: The apparatus of any of aspects 66-69, where receiving the sidelink SSB within the search space at the starting position that is independent of the slot boundaries is associated with an absence of any SCI messages within a time duration associated with the search space.

Aspect 71: The apparatus of any of aspects 66-70, where the means for receiving the control signaling indicating the search space include: means for receiving, prior to the search space and using a second starting position that is aligned with a slot boundary, a second sidelink SSB that indicates the search space.

Aspect 72: The apparatus of any of aspects 66-71, where the means for receiving the sidelink SSB include: means for receiving, via the sidelink SSB, an indication of a second search space associated with a second sidelink SSB, where a second starting position of the second sidelink SSB is independent of slot boundaries within the second search space.

Aspect 73: The apparatus of any of aspects 66-72, further including: means for receiving, from the first UE, an indication of a content of the sidelink SSB, where the content of the sidelink SSB is associated with a specific quantity of sidelink PSSs and a specific quantity of sidelink SSSs.

Aspect 74: The apparatus of aspect 73, further including: means for monitoring for the sidelink SSB in accordance with the content of the sidelink SSB.

Aspect 75: The apparatus of any of aspects 66-74, where the means for receiving the sidelink SSB include: means for receiving the sidelink SSB including a cyclic prefix extension that aligns the starting position of the sidelink SSB with a symbol boundary within the search space.

Aspect 76: The apparatus of any of aspects 66-75, further including: means for receiving, from the first UE, an indication of a set of possible starting positions of the sidelink SSB, where the starting position of the sidelink SSB is included in the set of possible starting positions.

Aspect 77: The apparatus of any of aspects 66-76, further including: means for receiving, from the first UE, one or more data messages using a sidelink shared channel that immediately follows the sidelink SSB at a slot boundary, where a duration of the sidelink SSB aligns an ending position of the sidelink SSB with the slot boundary.

Aspect 78: The apparatus of any of aspects 66-77, where the sidelink SSB is a floating sidelink SSB and the search space is exclusively associated with floating sidelink SSBs.

Aspect 79: A non-transitory computer-readable medium storing code for wireless communication at a first UE, the code including instructions executable by a processor to: transmit, to a second UE, control signaling indicating a search space associated with a sidelink SSB; and transmit the sidelink SSB at a starting position within the search space that is independent of slot boundaries within the search space, where the starting position is in accordance with performing an LBT procedure associated with the sidelink SSB.

Aspect 80: The non-transitory computer-readable medium of aspect 79, where the instructions are further executable by the processor to: transmit, to the second UE, one or more data messages using a sidelink shared channel that immediately follows the sidelink SSB in time, where the sidelink SSB indicates a COT associated with the one or more data messages.

Aspect 81: The non-transitory computer-readable medium of any of aspects 79-80, where the instructions are further executable by the processor to: perform a threshold quantity of consecutive LBT procedures, each LBT procedure of the threshold quantity of consecutive LBT procedures associated with one or more slot-based opportunities for channel occupancy, where transmitting the sidelink SSB within the search space at the starting position that is independent of the slot boundaries is associated with a failure of the first UE to obtain a COT in accordance with any of the threshold quantity of consecutive LBT procedures.

Aspect 82: The non-transitory computer-readable medium of any of aspects 79-81, where the instructions are further executable by the processor to: perform a total quantity of LBT procedures within a time duration, each LBT procedure of the total quantity of LBT procedures associated with one or more slot-based opportunities for channel occupancy, where transmitting the sidelink SSB within the search space at the starting position that is independent of the slot boundaries is associated with a ratio between a subset of failed LBT procedures of the total quantity of LBT procedures and the total quantity of LBT procedures satisfying a threshold ratio.

Aspect 83: The non-transitory computer-readable medium of any of aspects 79-82, where the instructions to perform the LBT procedure associated with the sidelink SSB are executable by the processor to: monitor, within a time duration associated with the search space, a sidelink control channel for SCI, where transmitting the sidelink SSB within the search space at the starting position that is independent of the slot boundaries is associated with the UE failing to decode any SCI messages within the time duration associated with the search space.

Aspect 84: The non-transitory computer-readable medium of any of aspects 79-83, where the instructions are further executable by the processor to: receive an indication of a resource reservation associated with other sidelink communication, where the resource reservation at least partially overlaps a COT associated with the sidelink SSB; and release the COT associated with the sidelink SSB in accordance with the resource reservation at least partially overlapping with the COT.

Aspect 85: The non-transitory computer-readable medium of any of aspects 79-84, where the instructions to transmit the control signaling indicating the search space are executable by the processor to: transmit, prior to the search space and using a second starting position that is aligned with a slot boundary, a second sidelink SSB that indicates the search space.

Aspect 86: The non-transitory computer-readable medium of any of aspects 79-85, where the instructions to transmit the sidelink SSB are executable by the processor to: transmit, via the sidelink SSB, an indication of a second search space associated with a second sidelink SSB, where a second starting position of the second sidelink SSB is independent of slot boundaries within the second search space.

Aspect 87: The non-transitory computer-readable medium of any of aspects 79-86, where the instructions are further executable by the processor to: transmit, to the second UE, an indication of a content of the sidelink SSB, where the content of the sidelink SSB is associated with a specific quantity of sidelink PSSs and a specific quantity of sidelink SSSs.

Aspect 88: The non-transitory computer-readable medium of any of aspects 79-87, where the instructions to transmit the sidelink SSB are executable by the processor to: transmit the sidelink SSB including a cyclic prefix extension that aligns the starting position of the sidelink SSB with a symbol boundary within the search space.

Aspect 89: The non-transitory computer-readable medium of any of aspects 79-88, where the instructions are further executable by the processor to: transmit, to the second UE, an indication of a set of possible starting positions of the sidelink SSB, where the starting position of the sidelink SSB is included in the set of possible starting positions.

Aspect 90: The non-transitory computer-readable medium of any of aspects 79-89, where the instructions are further executable by the processor to: transmit, to the second UE, one or more data messages using a sidelink shared channel that immediately follows the sidelink SSB at a slot boundary, where a duration of the sidelink SSB aligns an ending position of the sidelink SSB with the slot boundary.

Aspect 91: The non-transitory computer-readable medium of any of aspects 79-90, where the sidelink SSB is a floating sidelink SSB and the search space is exclusively associated with floating sidelink SSBs.

Aspect 92: A non-transitory computer-readable medium storing code for wireless communication, the code including instructions executable by a processor to: receive, from a first UE at a second UE, control signaling indicating a search space associated with a sidelink SSB; and receive the sidelink SSB at a starting position within the search space that is independent of slot boundaries within the search space.

Aspect 93: The non-transitory computer-readable medium of aspect 92, where the instructions are further executable by the processor to: receive, from the first UE, one or more data messages using a sidelink shared channel that immediately follows the sidelink SSB in time, where the sidelink SSB indicates a COT associated with the one or more data messages.

Aspect 94: The non-transitory computer-readable medium of any of aspects 92-93, where receiving the sidelink SSB within the search space at the starting position that is independent of the slot boundaries is associated with a failure of the first UE to obtain a COT in accordance with any of a threshold quantity of consecutive LBT procedures.

Aspect 95: The non-transitory computer-readable medium of any of aspects 92-94, where receiving the sidelink SSB within the search space at the starting position that is independent of the slot boundaries is associated with a ratio between a subset of failed LBT procedures of a total quantity of LBT procedures at the first UE and the total quantity of LBT procedures satisfying a threshold ratio.

Aspect 96: The non-transitory computer-readable medium of any of aspects 92-95, where receiving the sidelink SSB within the search space at the starting position that is independent of the slot boundaries is associated with an absence of any SCI messages within a time duration associated with the search space.

Aspect 97: The non-transitory computer-readable medium of any of aspects 92-96, where the instructions to receive the control signaling indicating the search space are executable by the processor to: receive, prior to the search space and using a second starting position that is aligned with a slot boundary, a second sidelink SSB that indicates the search space.

Aspect 98: The non-transitory computer-readable medium of any of aspects 92-97, where the instructions to receive the sidelink SSB are executable by the processor to: receive, via the sidelink SSB, an indication of a second search space associated with a second sidelink SSB, where a second starting position of the second sidelink SSB is independent of slot boundaries within the second search space.

Aspect 99: The non-transitory computer-readable medium of any of aspects 92-98, where the instructions are further executable by the processor to: receive, from the first UE, an indication of a content of the sidelink SSB, where the content of the sidelink SSB is associated with a specific quantity of sidelink PSSs and a specific quantity of sidelink SSSs.

Aspect 100: The non-transitory computer-readable medium of aspect 99, where the instructions are further executable by the processor to: monitor for the sidelink SSB in accordance with the content of the sidelink SSB.

Aspect 101: The non-transitory computer-readable medium of any of aspects 92-100, where the instructions to receive the sidelink SSB are executable by the processor to: receive the sidelink SSB including a cyclic prefix extension that aligns the starting position of the sidelink SSB with a symbol boundary within the search space.

Aspect 102: The non-transitory computer-readable medium of any of aspects 92-101, where the instructions are further executable by the processor to: receive, from the first UE, an indication of a set of possible starting positions of the sidelink SSB, where the starting position of the sidelink SSB is included in the set of possible starting positions.

Aspect 103: The non-transitory computer-readable medium of any of aspects 92-102, where the instructions are further executable by the processor to: receive, from the first UE, one or more data messages using a sidelink shared channel that immediately follows the sidelink SSB at a slot boundary, where a duration of the sidelink SSB aligns an ending position of the sidelink SSB with the slot boundary.

Aspect 104: The non-transitory computer-readable medium of any of aspects 92-103, where the sidelink SSB is a floating sidelink SSB and the search space is exclusively associated with floating sidelink SSBs.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data stored in memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above.

Whether such functionality is implemented using hardware or software depends upon the particular application and design constraints imposed on the overall system.

The hardware and data processing apparatus used to implement the various illustrative logics, logical blocks, modules and circuits described in connection with the aspects disclosed herein may be implemented or performed using a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented using hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted using one or more instructions or code of a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one location to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc. Disks may reproduce data magnetically and discs may reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communication at a first user equipment (UE), comprising:
   one or more interfaces configured to:
   output, to a second UE, control signaling indicating a search space associated with a sidelink synchronization signal block (SSB); and
   output the sidelink SSB at a starting position within the search space that is independent of slot boundaries within the search space, wherein the starting position is in accordance with performing a listen-before-talk (LBT) procedure associated with the sidelink SSB.

2. The apparatus of claim 1, wherein the one or more interfaces are further configured to:
   output, to the second UE, one or more data messages using a sidelink shared channel that immediately follows the sidelink SSB in time, wherein the sidelink SSB indicates a channel occupancy time (COT) associated with the one or more data messages.

3. The apparatus of claim 1, wherein a processing system is further configured to:
   perform a threshold quantity of consecutive LBT procedures, each LBT procedure of the threshold quantity of consecutive LBT procedures associated with one or more slot-based opportunities for channel occupancy, wherein outputting the sidelink SSB within the search space at the starting position that is independent of the slot boundaries is associated with a failure of the first UE to obtain a channel occupancy time (COT) in accordance with any of the threshold quantity of consecutive LBT procedures.

4. The apparatus of claim 1, wherein a processing system is further configured to:
perform a total quantity of LBT procedures within a time duration, each LBT procedure of the total quantity of LBT procedures associated with one or more slot-based opportunities for channel occupancy, wherein outputting the sidelink SSB within the search space at the starting position that is independent of the slot boundaries is associated with a ratio between a subset of failed LBT procedures of the total quantity of LBT procedures and the total quantity of LBT procedures satisfying a threshold ratio.

5. The apparatus of claim 1, wherein, to perform the LBT procedure associated with the sidelink SSB, a processing system is further configured to:
monitor, within a time duration associated with the search space, a sidelink control channel for sidelink control information (SCI), wherein outputting the sidelink SSB within the search space at the starting position that is independent of the slot boundaries is associated with the UE failing to decode any SCI messages within the time duration associated with the search space.

6. The apparatus of claim 1, wherein:
the one or more interfaces are further configured to:
obtain an indication of a resource reservation associated with other sidelink communication, wherein the resource reservation at least partially overlaps a channel occupancy time (COT) associated with the sidelink SSB; and
a processing system is configured to:
release the COT associated with the sidelink SSB in accordance with the resource reservation at least partially overlapping with the COT.

7. The apparatus of claim 1, wherein, to output the control signaling indicating the search space, the one or more interfaces are further configured to:
output, prior to the search space and using a second starting position that is aligned with a slot boundary, a second sidelink SSB that indicates the search space.

8. The apparatus of claim 1, wherein, to output the sidelink SSB, the one or more interfaces are further configured to:
output, via the sidelink SSB, an indication of a second search space associated with a second sidelink SSB, wherein a second starting position of the second sidelink SSB is independent of the slot boundaries within the second search space.

9. The apparatus of claim 1, wherein the one or more interfaces are further configured to:
output, to the second UE, an indication of a content of the sidelink SSB, wherein the content of the sidelink SSB is associated with a specific quantity of sidelink primary synchronization signals (PSSs) and a specific quantity of sidelink secondary synchronization signals (SSSs).

10. The apparatus of claim 1, wherein, to output the sidelink SSB, the one or more interfaces are further configured to:
output the sidelink SSB including a cyclic prefix extension that aligns the starting position of the sidelink SSB with a symbol boundary within the search space.

11. The apparatus of claim 1, wherein the one or more interfaces are further configured to:
output, to the second UE, an indication of a set of possible starting positions of the sidelink SSB, wherein the starting position of the sidelink SSB is included in the set of possible starting positions.

12. The apparatus of claim 1, wherein the one or more interfaces are further configured to:
output, to the second UE, one or more data messages using a sidelink shared channel that immediately follows the sidelink SSB at a slot boundary, wherein a duration of the sidelink SSB aligns an ending position of the sidelink SSB with the slot boundary.

13. An apparatus for wireless communication, comprising:
one or more interfaces configured to:
obtain, from a first user equipment (UE) at a second UE, control signaling indicating a search space associated with a sidelink synchronization signal block (SSB); and
obtain the sidelink SSB at a starting position within the search space that is independent of slot boundaries within the search space.

14. The apparatus of claim 13, wherein the one or more interfaces are further configured to:
obtain, from the first UE, one or more data messages using a sidelink shared channel that immediately follows the sidelink SSB in time, wherein the sidelink SSB indicates a channel occupancy time (COT) associated with the one or more data messages.

15. The apparatus of claim 13, wherein, to obtain the control signaling indicating the search space, the one or more interfaces are configured to:
obtain, prior to the search space and using a second starting position that is aligned with a slot boundary, a second sidelink SSB that indicates the search space.

16. The apparatus of claim 13, wherein, to obtain the sidelink SSB, the one or more interfaces are configured to:
obtain, via the sidelink SSB, an indication of a second search space associated with a second sidelink SSB, wherein a second starting position of the second sidelink SSB is independent of the slot boundaries within the second search space.

17. The apparatus of claim 13, wherein the one or more interfaces are configured to:
obtain, from the first UE, an indication of a content of the sidelink SSB, wherein the content of the sidelink SSB is associated with a specific quantity of sidelink primary synchronization signals (PSSs) and a specific quantity of sidelink secondary synchronization signals (SSSs).

18. The apparatus of claim 13, wherein, to obtain the sidelink SSB, the one or more interfaces are configured to:
obtain the sidelink SSB including a cyclic prefix extension that aligns the starting position of the sidelink SSB with a symbol boundary within the search space.

19. A method for wireless communication at a first user equipment (UE), comprising:
transmitting, to a second UE, control signaling indicating a search space associated with a sidelink synchronization signal block (SSB); and
transmitting the sidelink SSB at a starting position within the search space that is independent of slot boundaries within the search space, wherein the starting position is in accordance with performing a listen-before-talk (LBT) procedure associated with the sidelink SSB.

20. The method of claim 19, further comprising:
transmitting, to the second UE, one or more data messages using a sidelink shared channel that immediately follows the sidelink SSB in time, wherein the sidelink SSB indicates a channel occupancy time (COT) associated with the one or more data messages.

21. The method of claim 19, further comprising:
performing a threshold quantity of consecutive LBT procedures, each LBT procedure of the threshold quantity of consecutive LBT procedures associated with one or more slot-based opportunities for channel occupancy, wherein transmitting the sidelink SSB within the search space at the starting position that is independent of the slot boundaries is associated with a failure of the first UE to obtain a channel occupancy time (COT) in accordance with any of the threshold quantity of consecutive LBT procedures.

22. The method of claim 19, further comprising:
performing a total quantity of LBT procedures within a time duration, each LBT procedure of the total quantity of LBT procedures associated with one or more slot-based opportunities for channel occupancy, wherein transmitting the sidelink SSB within the search space at the starting position that is independent of the slot boundaries is associated with a ratio between a subset of failed LBT procedures of the total quantity of LBT procedures and the total quantity of LBT procedures satisfying a threshold ratio.

23. The method of claim 19, wherein performing the LBT procedure associated with the sidelink SSB comprises:
monitoring, within a time duration associated with the search space, a sidelink control channel for sidelink control information (SCI), wherein transmitting the sidelink SSB within the search space at the starting position that is independent of the slot boundaries is associated with the UE failing to decode any SCI messages within the time duration associated with the search space.

24. The method of claim 19, further comprising:
receiving an indication of a resource reservation associated with other sidelink communication, wherein the resource reservation at least partially overlaps a channel occupancy time (COT) associated with the sidelink SSB; and
releasing the COT associated with the sidelink SSB in accordance with the resource reservation at least partially overlapping with the COT.

25. A method for wireless communication, comprising:
receiving, from a first user equipment (UE) at a second UE, control signaling indicating a search space associated with a sidelink synchronization signal block (SSB); and
receiving the sidelink SSB at a starting position within the search space that is independent of slot boundaries within the search space.

26. The method of claim 25, further comprising:
receiving, from the first UE, one or more data messages using a sidelink shared channel that immediately follows the sidelink SSB in time, wherein the sidelink SSB indicates a channel occupancy time (COT) associated with the one or more data messages.

27. The method of claim 25, further comprising:
receiving, from the first UE, an indication of a content of the sidelink SSB, wherein the content of the sidelink SSB is associated with a specific quantity of sidelink primary synchronization signals (PSSs) and a specific quantity of sidelink secondary synchronization signals (SSSs).

28. The method of claim 25, wherein receiving the sidelink SSB comprises:
receiving the sidelink SSB including a cyclic prefix extension that aligns the starting position of the sidelink SSB with a symbol boundary within the search space.

29. The method of claim 25, further comprising:
receiving, from the first UE, an indication of a set of possible starting positions of the sidelink SSB, wherein the starting position of the sidelink SSB is included in the set of possible starting positions.

30. The method of claim 25, further comprising:
receiving, from the first UE, one or more data messages using a sidelink shared channel that immediately follows the sidelink SSB at a slot boundary, wherein a duration of the sidelink SSB aligns an ending position of the sidelink SSB with the slot boundary.

* * * * *